United States Patent
Nakamura et al.

(10) Patent No.: US 9,033,320 B2
(45) Date of Patent: May 19, 2015

(54) ANTI-VIBRATION RUBBER MEMBER AND PRODUCTION METHOD THEREOF

(71) Applicants: Tokai Rubber Industries, Ltd., Aichi-ken (JP); STT Inc., Tokyo-to (JP)

(72) Inventors: Yorikazu Nakamura, Aichi-ken (JP); Hiroyuki Matsumura, Aichi-ken (JP); Takahisa Suzuki, Kanagawa-ken (JP)

(73) Assignees: SUMITOMO RIKO COMPANY LIMITED, Aichi (JP); STT INC., Tokyo (JP)

( * ) Notice: Subject to any disclaimer, the term of this patent is extended or adjusted under 35 U.S.C. 154(b) by 44 days.

(21) Appl. No.: 13/893,731

(22) Filed: May 14, 2013

(65) Prior Publication Data
US 2013/0285298 A1  Oct. 31, 2013

Related U.S. Application Data

(63) Continuation of application No. PCT/JP2012/066249, filed on Jun. 26, 2012.

(30) Foreign Application Priority Data

Jun. 30, 2011 (JP) .................................. 2011-145395

(51) Int. Cl.
*F16F 7/00* (2006.01)
*F16F 15/08* (2006.01)
(Continued)

(52) U.S. Cl.
CPC . *F16F 15/08* (2013.01); *F16F 1/38* (2013.01); *B60G 7/02* (2013.01); *F16F 1/3605* (2013.01);
(Continued)

(58) Field of Classification Search
CPC .. B60G 21/0551; F16F 1/3605; F16F 1/3835; F16F 15/08
USPC ........... 267/292, 293, 140, 140.3, 140.4, 141; 184/5.1, 23; 384/902, 322, 300
See application file for complete search history.

(56) References Cited

U.S. PATENT DOCUMENTS 4,880,318 A * 11/1989 Shibahara et al. ............ 384/125
4,916,749 A *  4/1990 Urban et al. .................. 384/298
(Continued)

FOREIGN PATENT DOCUMENTS

JP     2003-214431 A    7/2003
JP     2006-273181 A   10/2006
(Continued)

OTHER PUBLICATIONS
Search report from International Patent Appl. No. PCT/JP2012/066249, mail date is Jul. 24, 2012.
(Continued)

*Primary Examiner* — Thomas Irvin
(74) *Attorney, Agent, or Firm* — Greenblum & Bernstein, P.L.C.

(57) ABSTRACT

An anti-vibration rubber member includes: a rubber elastic body that is made of a self-lubricating rubber containing an elastomer and a bleeding lubricant; a coating film that covers at least a portion of a sliding inner surface that is among a surface of the rubber elastic body and disposed on an inner side of the sliding surface, contains a resin having a mercapto group, is deformable to follow up deformation of the rubber elastic body, and is formed with a plurality of minute holes capable of reserving the bleeding lubricant which has oozed out of the rubber elastic body; and a lubricating film that covers at least a portion of a surface of the coating film, is formed to include the bleeding lubricant penetrating the coating film from the rubber elastic body and oozing onto the surface of the coating film, and forms at least a portion of the sliding surface.

13 Claims, 18 Drawing Sheets

(51) Int. Cl.
*F16F 1/38* (2006.01)
*B60G 7/02* (2006.01)
*F16F 1/36* (2006.01)
*B05D 3/00* (2006.01)
*B05D 3/02* (2006.01)

(52) U.S. Cl.
CPC ... *B60G 2204/1222* (2013.01); *B60G 2204/143* (2013.01); *B60G 2204/41* (2013.01); *B05D 3/002* (2013.01); *B05D 3/0254* (2013.01); *F16F 1/3835* (2013.01); *F16F 1/3828* (2013.01); *Y10S 384/902* (2013.01)

(56) References Cited

U.S. PATENT DOCUMENTS

| | | | | |
|---|---|---|---|---|
| 6,467,961 | B2 * | 10/2002 | Nakamaru et al. | 384/13 |
| 6,474,631 | B2 * | 11/2002 | Hadano et al. | 267/276 |
| 2011/0031664 | A1 | 2/2011 | Nakamura et al. | |
| 2011/0170814 | A1 * | 7/2011 | Nakamura et al. | 384/125 |

FOREIGN PATENT DOCUMENTS

| | | |
|---|---|---|
| WO | 2010/038746 A1 | 4/2010 |
| WO | 2010/038749 A1 | 4/2010 |

OTHER PUBLICATIONS

U.S. Appl. No. 13/054,280, filed Jan. 14, 2011.
Office Action of Japanese Patent Application No. 2011-145395 mailed Dec. 9, 2014; along with an English Translation thereof.

* cited by examiner

US 9,033,320 B2

ANTI-VIBRATION RUBBER MEMBER AND PRODUCTION METHOD THEREOF

CLAIM FOR PRIORITY

This application is a continuation of PCT/JP2012/066249 filed Jun. 26, 2012, and claims the priority benefit of Japanese Application No. 2011-145395, filed Jun. 30, 2011, the contents of which are expressly incorporated by reference in their entirety.

TECHNICAL FIELD

The present invention relates to an anti-vibration rubber member that is in sliding contact with a mating member that vibrates relative to the anti-vibration rubber member, and to a production method thereof.

BACKGROUND ART

A stabilizer bushing is an example of an anti-vibration rubber member. The stabilizer bushing is fixed to a vehicle body through a bracket. A stabilizer bar is disposed in a holding hole of the stabilizer bushing.

For example, during turning of the vehicle, a centrifugal force causes the outer wheel side of the suspension to sink downward while the inner wheel side elongates. This twists the stabilizer bar. Utilizing an elastic restoring force against such torsion, the stabilizer bar works to lift up the outer wheel side of the suspension. Thus, the stabilizer bar maintains the vehicle horizontal.

When the stabilizer bar is twisted or when the twisted stabilizer bar recovers due to the elastic restoring force, the stabilizer bar outer circumferential surface and the stabilizer bushing inner circumferential surface slide relative to one another. Higher friction resistance during such sliding may cause more abnormal noise (a so-called stick slip noise). Higher friction resistance during such sliding may also reduce the riding comfort of the vehicle.

In view of these points, a liner made of polytetrafluoroethylene (PTFE) with a small friction coefficient is conventionally inserted into a holding hole. The inner circumferential surface of the liner and the outer circumferential surface of the stabilizer bar then slidingly contact one another. However, the PTFE liner is relatively expensive. Therefore, if the PTFE liner is used, the cost of manufacturing the stabilizer bushing increases.

Hence, stabilizer bushings that do not require a PTFE liner have been developed. For example, Patent Documents 1 and 2 describe a stabilizer bushing that has a rubber elastic body made of a self-lubricating rubber, a coating film, and a lubricating film. A holding hole is formed on the radially inner side of the rubber elastic body. A stabilizer bar is disposed in the holding hole. The coating film covers the inner circumferential surface of the holding hole. A bleeding lubricant included in the self-lubricating rubber penetrates the coating film and oozes onto the surface of the coating film to form the lubricating film. According to the stabilizer bushing described in Patent Documents 1 and 2, primarily the lubricating film and supplementarily the coating film are in sliding contact with the stabilizer bar. Consequently, the friction resistance between the stabilizer bushing and the stabilizer bar is reduced.

RELATED-ART DOCUMENTS

Patent Documents

Patent Document 1: International Patent Application Publication No. 2010/038746

Patent Document 2: International Patent Application Publication No. 2010/038749

SUMMARY OF THE INVENTION

Problem to be Solved by the Invention

In the stabilizer bushing described in Patent Documents 1 and 2, when the temperature is raised during use or the like, the bleeding lubricant in the self-lubricating rubber becomes easily soluble. Therefore, the bleeding lubricant oozes onto the surface of the rubber elastic body faster, which increases the amount of the bleeding lubricant which oozes out. If the amount of the bleeding lubricant which oozes out becomes larger than the amount of bleeding lubricant that can penetrate the coating film, the excessive amount of bleeding lubricant accumulates at the interface between the coating film and the rubber elastic body. If this happens, the bleeding lubricant accumulating at the interface may push up the coating film and may separate the coating film from the rubber elastic body even if the rubber elastic body and the coating film are initially strongly joined to each other. If the coating film is separated, the friction resistance between the stabilizer bushing and the stabilizer bar (mating member) may be increased.

An anti-vibration rubber member and a production method thereof according to the present invention were accomplished in view of the foregoing problems. Thus, it is an object of the present invention to provide an anti-vibration rubber member wherein there is low friction resistance between the anti-vibration rubber member and a mating member and a coating film is not prone to separation from a rubber elastic body even at a high temperature, and a relatively simple production method thereof.

Means for Solving the Problem (1) In order to solve the above problem, the anti-vibration rubber member according to the present invention absorbs at least a portion of vibration of a mating member and has a sliding surface that is relatively in sliding contact with the mating member. The anti-vibration rubber member is characterized by including: a rubber elastic body that is made of a self-lubricating rubber containing an elastomer and a bleeding lubricant; a coating film that covers at least a portion of a sliding inner surface that is among a surface of the rubber elastic body and disposed on an inner side of the sliding surface, contains a resin having at least one type of functional group selected from a mercapto group, a vinyl group, an epoxy group, a methacryloxy group, and an amino group, is deformable to follow up deformation of the rubber elastic body, and is formed with a plurality of minute holes capable of reserving the bleeding lubricant which has oozed out of the rubber elastic body; and a lubricating film that covers at least a portion of a surface of the coating film, is formed to include the bleeding lubricant penetrating the coating film from the rubber elastic body and oozing onto the surface of the coating film, and forms at least a portion of the sliding surface.

The anti-vibration rubber member of the present invention includes the rubber elastic body, the coating film, and the lubricating film. The plurality of minute holes is formed in the coating film. The minute holes can reserve the bleeding lubricant which has oozed out of the rubber elastic body. Thus, even if the bleeding lubricant in the self-lubricating rubber oozes out faster than the bleeding lubricant penetrates the coating film at a high temperature and all of the bleeding lubricant which has oozed out cannot penetrate the coating film, the excessive amount of the bleeding lubricant can be reserved in the minute holes in the coating film. Therefore, the bleeding lubricant is not prone to accumulate at the interface between the coating film and the rubber elastic body. Thus, according to the anti-vibration rubber member of the present invention, the coating film is not prone to separation from the rubber elastic body even at a high temperature. That is, the anti-vibration rubber member according to the present invention provides good durability.

The lubricating film is formed to include the bleeding lubricant penetrating the coating film from the rubber elastic body and oozing onto the surface of the coating film. That is, the lubricating film may be formed from only the bleeding lubricant which has oozed out of the rubber elastic body, and may be formed to include not only the bleeding lubricant but also other lubricating components. Although described in detail later, a bleeding lubricant (which may be the same as or different from the bleeding lubricant in the rubber elastic body in term of component) may be compounded in the coating for forming the coating film in order to form minute holes in the coating film. The bleeding lubricant in the coating is released from the coating when baked, and oozes onto the surface of the coating which is being cured. In this case, the lubricating film is formed from both the bleeding lubricant penetrating the coating film from the rubber elastic body and oozing onto the surface of the coating film, and the bleeding lubricant released from the coating.

In the anti-vibration rubber member according to the present invention, the lubricating film is in sliding contact with the mating member. In the case where the lubricating film is insufficient on a portion of the sliding surface, the coating film containing the bleeding lubricant is exposed from this portion and comes into sliding contact with the mating member. Therefore, according to the anti-vibration rubber member of the present invention, primarily the lubricating film and supplementarily the coating film are in sliding contact with the mating member. In addition, the rubber elastic body is not in sliding contact with the mating member. Thus, there is low friction resistance between the anti-vibration rubber member and the mating member.

(1-1) In the configuration of (1) above, the sliding inner surface is preferably shaped as a generally smooth surface (i.e., a surface without artificial unevenness; a flat surface is obviously acceptable and a curved surface is also acceptable). In the case where the sliding inner surface is provided with unevenness, projections tend to come into sliding contact (linear contact) with the mating member to be worn. The sliding inner surface according to the present configuration is not formed with unevenness. Therefore, the sliding inner surface is in generally total surface contact with the mating member through the coating film and the lubricating film (or, depending on the case, only through the coating film). Thus, the rubber elastic body has high durability.

(2) In the configuration of (1) above, the bleeding lubricant which has oozed out of the rubber elastic body is preferably reserved in at least some of the plurality of minute holes.

According to the present configuration, the bleeding lubricant which has oozed out of the rubber elastic body is reserved in the coating film. That is, the bleeding lubricant can remain in the coating film even if a large amount of the bleeding lubricant oozes out, and therefore the bleeding lubricant is not prone to accumulate at the interface between the coating film and the rubber elastic body. Therefore, the coating film is not prone to separation from the rubber elastic body even at a high temperature. In addition, even in a portion of the sliding surface on which the lubricating film is insufficient and the coating film is exposed, the coating film reserving the bleeding lubricant is exposed and comes into sliding contact with the mating member. Thus, there is low friction resistance between the anti-vibration rubber member and the mating member.

(3) In the configuration of (1) or (2) above, the coating film preferably further contains a solid lubricant.

According to the present configuration, the friction resistance of the coating film itself is low with respect to the mating member. Therefore, even if there is a portion with insufficient lubricating film on the sliding surface, the friction resistance between the anti-vibration rubber member and the mating member can be reduced.

(4) In the configuration of (3) above, the solid lubricant is preferably made of polytetrafluoroethylene.

Polytetrafluoroethylene (PTFE) has a particularly small friction coefficient among other solid lubricants. Therefore, according to the present configuration, the friction resistance of the coating film itself with respect to the mating member can be further reduced.

(5) in the configuration of (4) above, the coating film preferably contains 200 parts by mass or less of the solid lubricant per 100 parts by mass of the resin. Here, the reason for containing 200 parts by mass or less of the solid lubricant is that more than 200 parts by mass of the solid lubricant would make the coating film more susceptible to wear. In other words, the durability of the coating film would decrease.

(5-1) In the configuration of (5) above, the coating film preferably includes 160 parts by mass or less of the solid lubricant. In this way, the durability of the coating film can be maintained and the friction resistance of the coating film with respect to the mating member can be reduced.

(5-2) In the configuration of (5-1) above, the coating film preferably includes at least 110 and 130 parts by mass or less of the solid lubricant. Here, the reason for including at least 110 parts by mass of the solid lubricant is that the friction resistance of the coating film with respect to the mating member increases if less than 110 parts by mass of the solid lubricant is included. Further, the reason for including 130 parts by mass or less of the solid lubricant is that the coating film is more susceptible to wear if more than 130 parts by mass of the solid lubricant is included. According to the present configuration, the durability of the coating film can be further maintained and the friction resistance of the coating film with respect to the mating member can be further reduced.

(6) In the configuration of any one of (1) to (5) above, the resin is preferably a silicone resin.

According to the present configuration, the coating film is formed with the silicone resin included. This facilitates penetration of the coating film by the bleeding lubricant contained in the rubber elastic body. Thus, the lubricating film can be reliably formed on at least a portion of the surface of the coating film. In addition, the coating film is relatively flexible because the coating film is formed with the silicone resin included. Therefore, the coating film also easily deforms to follow up deformation of the rubber elastic body.

(7) In the configuration of (6) above, the silicone resin preferably has a less dense cross-linked structure than a straight silicone resin and a modified product thereof, and has rubber elasticity.

Here, a "straight silicone resin" refers to a silicone resin that includes only a methyl group, and a silicone resin that includes only a methylphenyl group. A "modified product of the straight silicone resin" includes an epoxy-modified silicone resin, an alkyd-modified silicone resin, a polyester-modified silicone resin, a silica-modified silicone resin, an acrylic-modified silicone resin, and the like. A silicone resin that "has rubber elasticity" includes a silicon resin mixed with rubber and a silicone resin with rubber elasticity that are used in a rubber coating agent or the like.

According to the present configuration, the cross-linked structure of the silicone resin is not dense, whereby the bleeding lubricant of the rubber elastic body can even more easily penetrate the coating film. Thus, the lubricating film can be even more reliably formed on at least a portion of the surface of the coating film.

(8) In the configuration of any one of (1) to (7) above, the rubber elastic body preferably has a holding hole in which the mating member is disposed, and the sliding inner surface is preferably an inner circumferential surface of the holding hole.

According to the present configuration, the friction resistance of the inner circumferential surface of the holding hole with respect to an outer circumferential surface of the mating member can be reduced. Therefore, a torsional torque applied from the outer circumferential surface of the mating member to the inner circumferential surface of the holding hole can be reduced.

(9) In order to solve the above problem, the production method of an anti-vibration rubber member according to the present invention is a production method of an anti-vibration rubber member that absorbs at least a portion of vibration of a mating member and has a sliding surface that is relatively in sliding contact with the mating member. The production method of an anti-vibration rubber member is characterized by including the steps of: creating a rubber elastic body that is made of a self-lubricating rubber containing an elastomer and a bleeding lubricant through a cross-linking reaction; degreasing a sliding inner surface that is among a surface of the rubber elastic body and disposed on an inner side of the sliding surface; coating on the sliding inner surface after degreasing a coating that contains a thermosetting resin having at least one type of functional group selected from a mercapto group, a vinyl group, an epoxy group, a methacryloxy group, and an amino group, and a minute hole forming agent that is released when baked to form minute holes in a coating film; and baking the rubber elastic body coated with the coating such that a coating film is formed on the sliding inner surface while the minute hole forming agent is released from the coating, and the bleeding lubricant of the rubber elastic body penetrates the coating film and oozes onto a surface of the coating film to form a lubricating film including the bleeding lubricant on the surface of the coating film.

The production method of an anti-vibration rubber member according to the present invention has a cross-linking process, a degreasing process, a coating process, and a baking process. In the cross-linking process, the rubber elastic body is created through a cross-linking reaction. In the degreasing process, the sliding inner surface is degreased in order to temporarily remove the bleeding lubricant oozing from the sliding inner surface. In the coating process, the coating is applied (which includes coating by brushing or the like and also application by spraying or the like) on the sliding inner surface from which the bleeding lubricant has been removed. In the baking process, the coating is hardened by heat and forms the coating film on the sliding inner surface of the rubber elastic body. The coating film is strongly joined (chemically bonded) to the rubber elastic body through the use of at least one type of functional group selected from the mercapto group, the vinyl group, the epoxy group, the methacryloxy group, and the amino group. In addition, the bleeding lubricant of the rubber elastic body penetrates the coating film and oozes onto the surface of the coating film. The lubricating film is formed on the surface of the coating film primarily by the bleeding lubricant.

Here, the coating for forming the coating film contains the minute hole forming agent. The minute hole forming agent is released from the coating by heat during baking. That is, in the baking process, the minute hole forming agent is released when the coating is cured, whereby the plurality of minute holes is formed inside the coating.

According to the production method of an anti-vibration rubber member of the present invention, the coating film having the plurality of minute holes can be relatively easily formed by compounding the minute hole forming agent in the coating. The minute hole forming agent is released from the coating by heat during baking. Note that the minute hole forming agent and decomposition products of the minute hole forming agent may remain in the coating film after being cured unless the performance of the coating film is affected. In addition, the minute holes can be reliably formed if the minute hole forming agent is released when baked faster than the bleeding lubricant oozes out. In this respect, the baking temperature and the like may be adjusted besides choosing the resin of the coating film, the minute hole forming agent, the elastomer of the rubber elastic body, and the bleeding lubricant.

The minute holes formed in the coating film can reserve the bleeding lubricant which has oozed out of the rubber elastic body. Thus, even if the bleeding lubricant in the self-lubricating rubber oozes out faster than the bleeding lubricant penetrates the coating film at a high temperature and all of the bleeding lubricant which has oozed out cannot penetrate the coating film, the excessive amount of the bleeding lubricant is reserved in the minute holes in the coating film. Consequently, the bleeding lubricant is not prone to accumulate at the interface between the coating film and the rubber elastic body. Therefore, separation of the coating film from the rubber elastic body can be suppressed even at a high temperature.

Thus, according to the production method of an anti-vibration rubber member of the present invention, an anti-vibration rubber member can be relatively easily produced, wherein there is low friction resistance between the anti-vibration rubber member and a mating member and a coating film is not prone to separation from a rubber elastic body even at a high temperature.

(10) In the configuration of (9) above, the minute hole forming agent is preferably formed from at least one type selected from a bleeding lubricant and a foaming agent.

The bleeding lubricant in the coating oozes onto the surface of the coating which is being cured when baked. The bleeding lubricant then forms the lubricating film. Meanwhile, the foaming agent is gasified when baked, and released from the coating film which is being cured. In either case, the minute holes are formed after the agent or the bleeding lubricant is removed. Thus, according to the present configuration, the minute holes can be formed without hindering formation of the coating film or the lubricating film.

(11) In the configuration of (9) above, preferably, the minute hole forming agent is formed from a bleeding lubricant; and the lubricating film is formed from both the bleeding lubricant contained in the rubber elastic body and the minute hole forming agent.

The bleeding lubricant is also contained in the rubber elastic body. The bleeding lubricant forms the lubricating film. Hence, according to the present configuration, impurities are not prone to remain in the coating film or the lubricating film, and the performance of the coating film or the lubricating film is not prone to be affected. Note that the bleeding lubricant for use as the minute hole forming agent may be the same as or different from the bleeding lubricant in the rubber elastic body in terms of component.

(11-1) In the configuration of (11) above, the thermosetting resin is preferably a silicone resin.

In the case where the matrix of the coating film is a silicone resin, the bleeding lubricant of the minute hole forming agent is easily removed from the coating film. Hence, the minute hole forming agent can be easily released faster than the bleeding lubricant oozes out of the rubber elastic body. This makes it possible to reliably form the minute holes.

(11-2) In the configuration of (11-1) above, the silicone resin preferably has a less dense cross-linked structure than a straight silicone resin and a modified product thereof, and has rubber elasticity.

According to the present configuration, the cross-linked structure of the silicone resin is not dense, whereby the bleeding lubricant of the minute hole forming agent can be even more easily removed from the coating film. Thus, the minute hole forming agent can be released faster, and the minute holes can be even more reliably formed.

(12) In the configuration of (10) or (11) above, the minute hole forming agent preferably includes at least one type of the bleeding lubricant contained in the rubber elastic body.

According to the present configuration, the lubricating film which affects the rubber elastic body to a small degree and which is stable can be formed. Moreover, the performance of the coating film or the lubricating film is not prone to be affected. The components of the bleeding lubricant of the minute hole forming agent may be completely the same as the components of the bleeding lubricant contained in the rubber elastic body, or may only partially overlap such components. In the latter case, it is desirable that the components of the bleeding lubricant of the minute hole forming agent be include a main component (a component with a large amount) of the bleeding lubricant contained in the rubber elastic body.

(13) In the configuration of any of (9) to (12) above, the amount of the minute hole forming agent is preferably 0.5% by mass or more and 20% by mass or less if the solid content forming the coating is defined as 100% by mass.

The amount of the minute hole forming agent may be determined in consideration of the formation of the minute holes and the performance of the coating film. That is, if the amount of the minute hole forming agent is too large, the proportion in volume of the minute holes in the coating film is large and the strength and the rigidity of the coating film itself is reduced. If the amount of the minute hole forming agent is too small, on the other hand, the minute holes enough to reserve the bleeding lubricant can not be formed. In this respect, according to the present configuration, the minute holes can be formed in a desired manner while the performance of the coating film is maintained.

Effects of the Invention

According to the present invention, an anti-vibration rubber member can be provided, wherein there is low friction resistance between the anti-vibration rubber member and a mating member and a coating film is not prone to separation from a rubber elastic body even at a high temperature. Further, according to the present invention, a relatively simple production method of the anti-vibration rubber member can be provided.

DESCRIPTION OF THE REFERENCE NUMERALS

1L: stabilizer bushing (anti-vibration rubber member), 1R: stabilizer bushing (anti-vibration rubber member), 2L: bracket, 2R: bracket, 3R: stopper (anti-vibration rubber member), 4R: lower arm bushing, 5R: bracket, 8: vehicle, 9: vehicle 10L: rubber elastic body, 11L: coating film, 12L: lubricating film, 20L: bushing support portion, 21L: fixing portion, 30R: circular disc, 31R: rubber member body, 32R: rubber elastic body, 33R: coating film, 34R: lubricating film, 35R: coating, 40R: inner tube fitting, 41R: outer tube fitting, 42R: rubber member, 50R: front wall, 51R: rear wall, 80: suspension, 81: hub unit, 83: drive shaft, 84R: lower suspension arm, 90: suspension, 91: hub unit, 92: steering gear, 93: drive shaft, 95: body 100L: holding hole, 101L: cut portion, 102L: blend rubber (elastomer), 103L: bleeding lubricant, 104L: flange portion, 110L: silicone resin, 111L: solid lubricant, 112L: minute hole, 113L: minute hole forming agent, 200L: flange portion, 210L: bolt insertion hole, 211L: bolt, 300R: bolt insertion hole, 320R: rib, 321R: blend rubber (elastomer), 322R: bleeding lubricant, 330R: silicone resin, 331R: solid lubricant, 332R: minute hole, 333R: base material, 334R: minute hole forming agent, 500R: bolt insertion hole, 510R: bolt insertion hole, 800R: spring, 801R: shock absorber, 840R: bushing accommodation tube portion (mating member), 841R: bolt, 842R: nut, 900L: spring, 900R: spring, 901L: shock absorber, 901R: shock absorber, 902L: lower suspension arm, 902R: lower suspension arm, 903: stabilizer bar (mating member), 950L: recess portion, 951L: bolt securing hole C: clearance, S: fastening amount

MODES FOR CARRYING OUT THE INVENTION

Hereinafter, embodiments of an anti-vibration rubber member and a production method thereof according to the present invention will be described.

First Embodiment

The present embodiment practices the anti-vibration rubber member of the present invention as a stopper.

[Stopper Layout]

Figure 1:
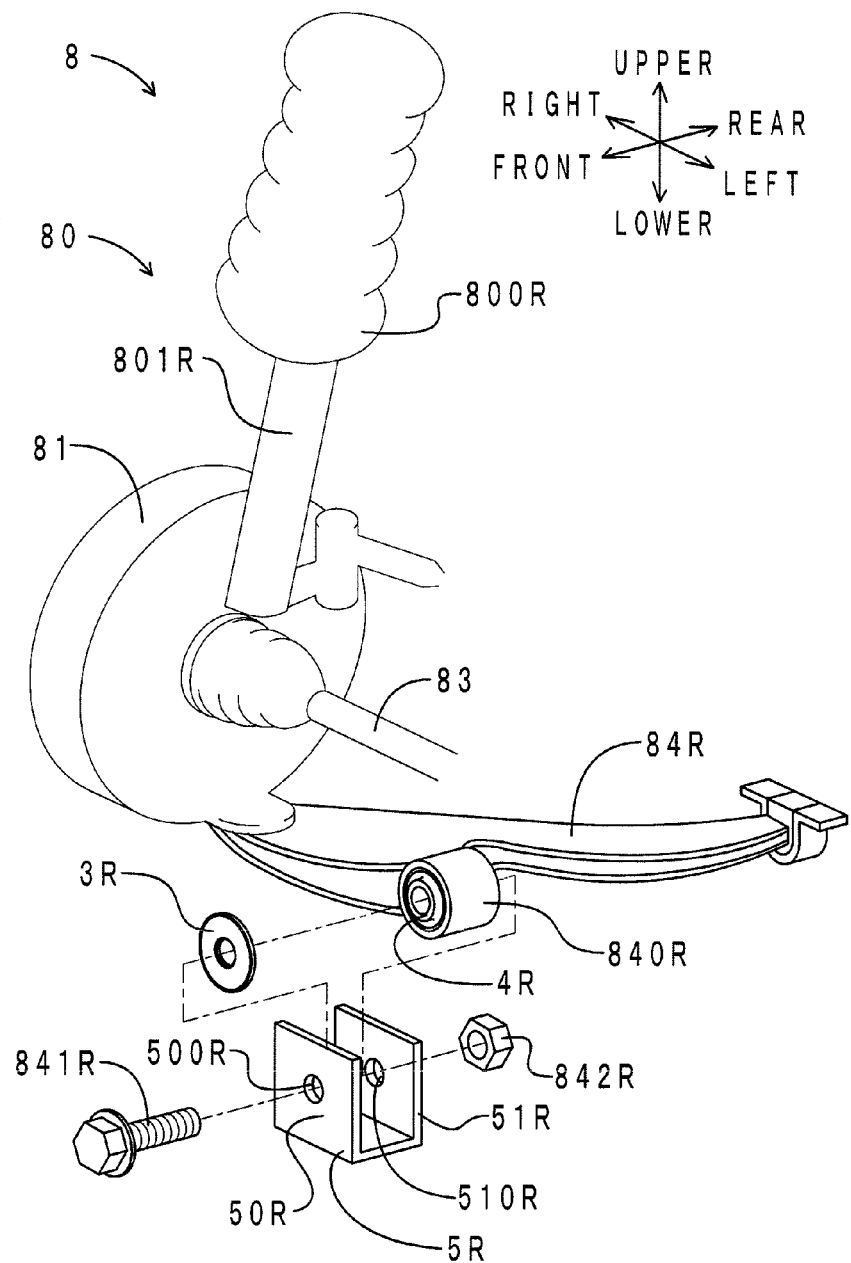
FIG. 1 is a layout drawing of a stopper according to a first embodiment.

First, the layout of the stopper according to the present embodiment will be described. FIG. 1 shows a layout drawing of the stopper according to the present embodiment. As shown in FIG. 1, members including a suspension 80, a hub unit 81, and a drive shaft 83 are arranged in the vicinity of a front wheel of a vehicle 8. The suspension 80 includes a spring 800R, a shock absorber 801R, a lower suspension arm 84R, and the like. The lower suspension arm 84R is made of steel and has a generally flat V-shaped configuration. A front end (an end of the V shape) of the lower suspension arm 84R is formed with a bushing accommodation tube portion 840R. A lower arm bushing 4R is press-fit to an inner portion of the bushing accommodation tube portion 840R. A stopper 3R is disposed in front of the lower arm bushing 4R. A bracket 5R is made of steel and has a C-shaped configuration that opens upward. The bracket 5R is fixed to a body (not shown) of the vehicle 8. The stopper 3R and the bushing accommodation tube portion 840R (lower arm bushing 4R) are accommodated in an inner portion of the C-shaped opening of the bracket 5R. The stopper 3R and the lower arm bushing 4R are oscillatably attached to the bracket 5R by a bolt 841R and a nut 842R. The stopper 3R suppresses the bushing accommodation tube portion 840R from coming into direct sliding contact with the bracket 5R. The bushing accommodation tube portion 840R is included in a mating member of the present invention.

[Stopper Structure]

Figure 2:
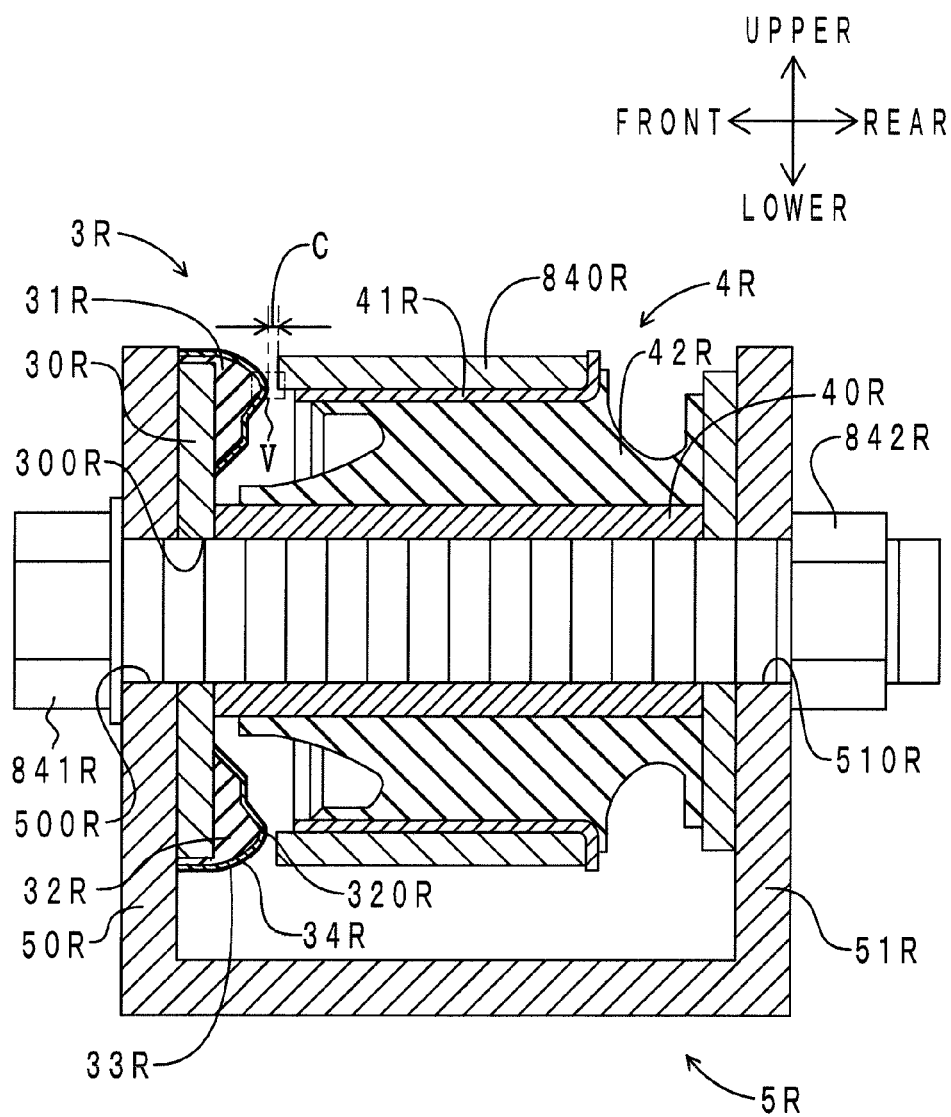
FIG. 2 is an axial cross-sectional view of the stopper and a lower arm bushing mounted to a bracket.
Figure 3:
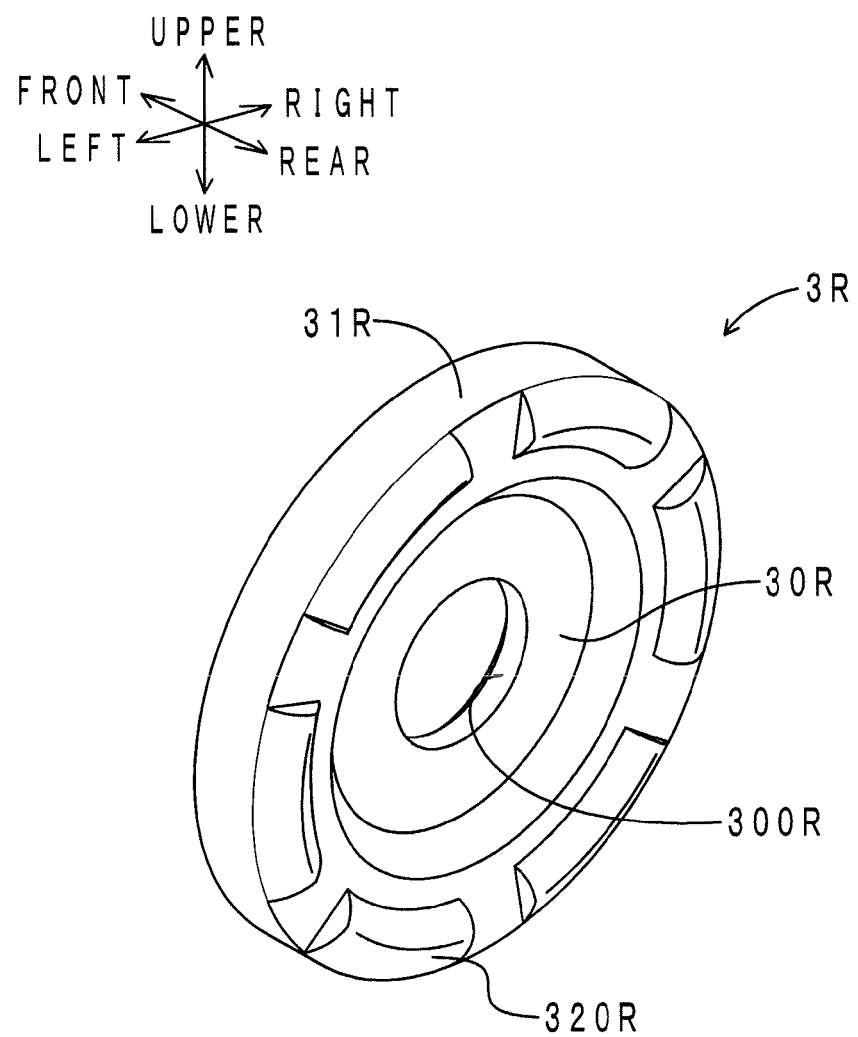
FIG. 3 is a perspective view of the stopper.
Figure 4:
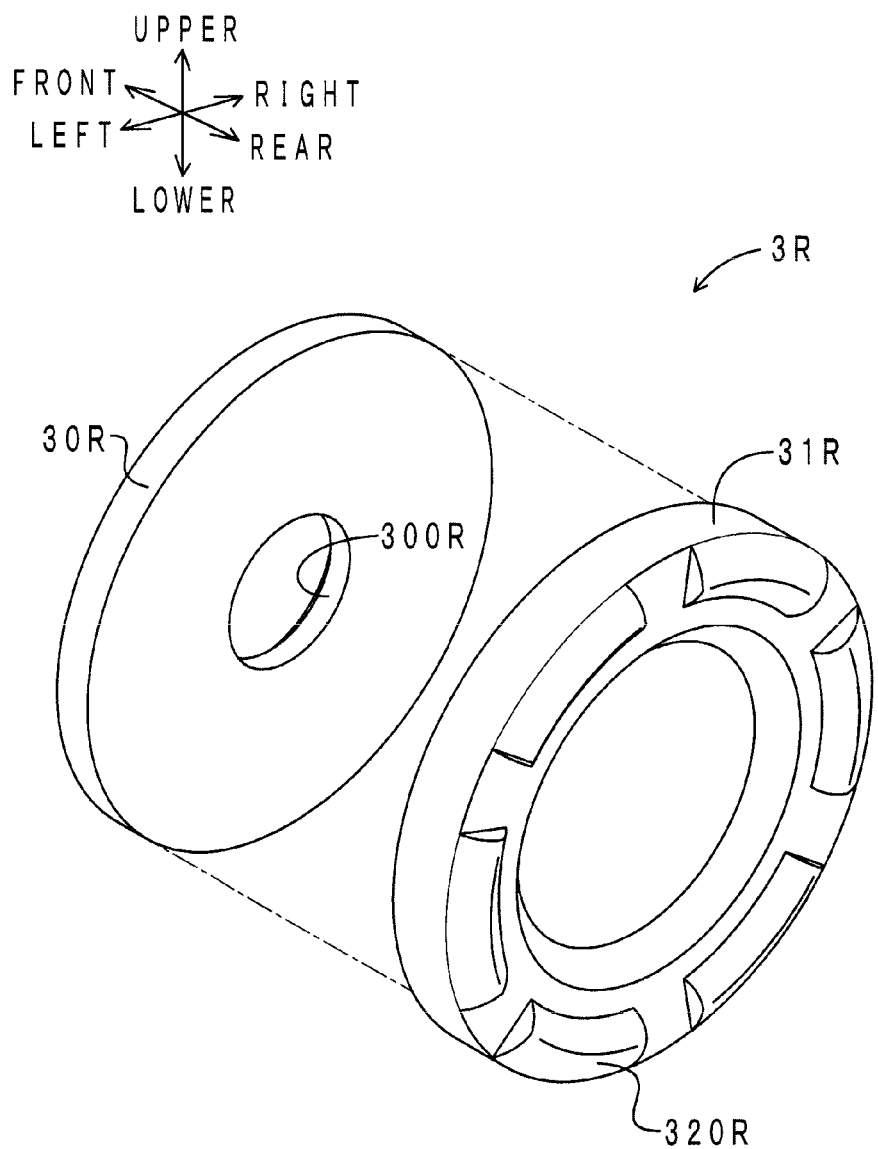
FIG. 4 is an exploded perspective view of the stopper.
Figure 5:
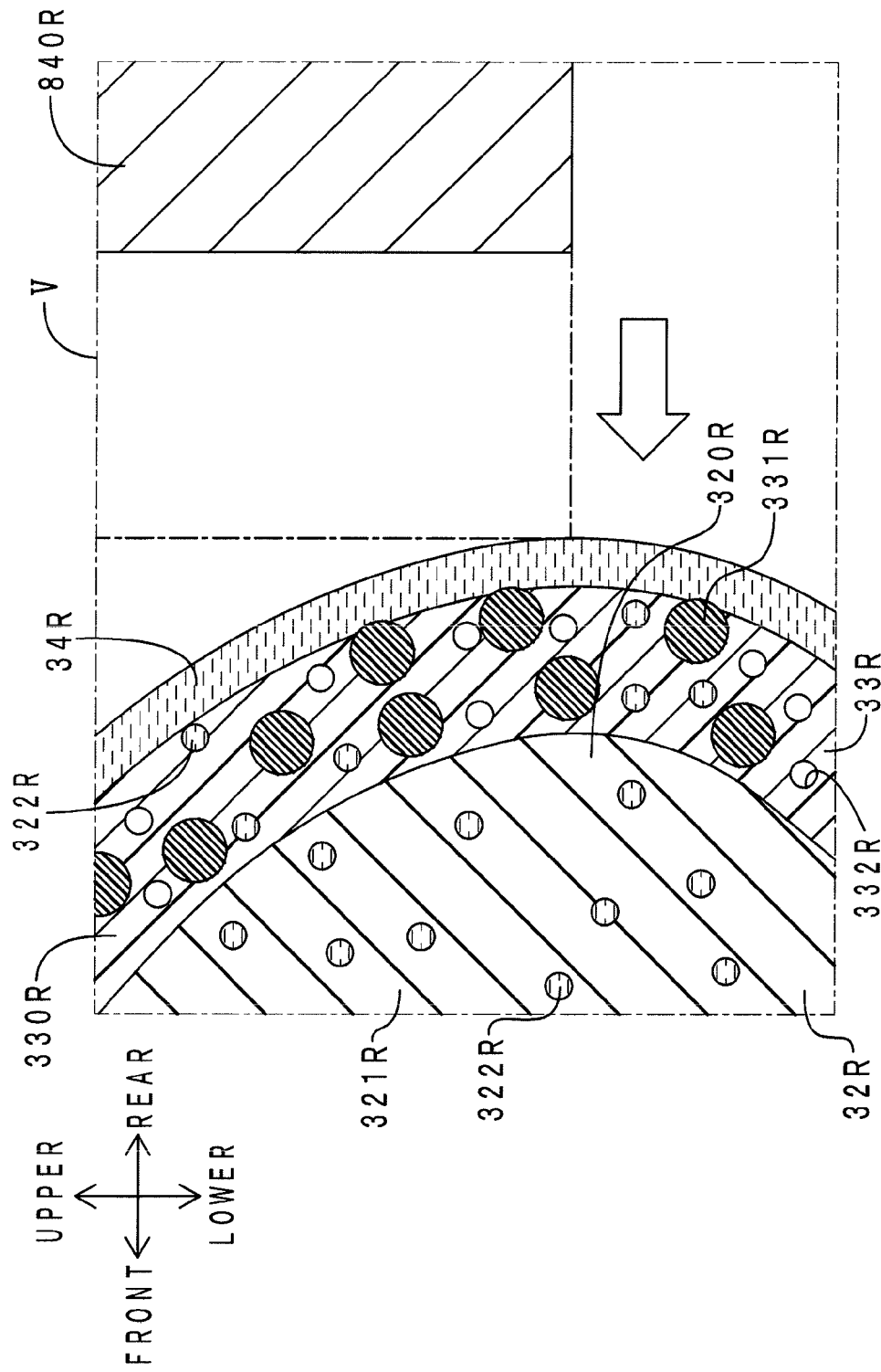
FIG. 5 is an enlarged view of inside a box V in FIG. 2.

Next, the structure of the stopper 3R according to the present embodiment will be described. FIG. 2 shows an axial (longitudinal) cross-sectional view of the stopper and the lower arm bushing mounted to the bracket according to the present embodiment. FIG. 3 shows a perspective view of the stopper according to the present embodiment. FIG. 4 shows an exploded perspective view of the stopper according to the present embodiment. FIG. 5 shows an enlarged view of inside a box V in FIG. 2. Note that FIG. 5 is a schematic diagram for explaining the function of the stopper 3R of the present embodiment. As shown in FIGS. 2 to 5, the stopper 3R of the present embodiment includes a circular disc 30R and a rubber member body 31R.

The circular disc 30R is made of steel and has a ring shape. A bolt insertion hole 300R is formed at the center of the circular disc 30R. A bolt 841R is inserted into an inner portion of the bolt insertion hole 300R.

The rubber member body 31R includes a rubber elastic body 32R, a coating film 33R, and a lubricating film 34R. The rubber elastic body 32R has a ring shape. The rubber elastic body 32R is disposed so as to cover the rear surface and the outer circumferential surface of the circular disc 30R. The rubber elastic body 32R and the circular disc 30R are bonded together by cross-linking. The rear surface of the rubber elastic body 32R is formed with a plurality of ribs 320R. The ribs 320R are arranged in a circular configuration. The ribs 320R are also arranged in series to form a dashed line. The surface of the rib 320R is included in a sliding inner surface of the present invention. The surface of the rib 320R has a predetermined curvature and is shaped as a generally smooth surface. The coating film 33R covers the surface of the rubber elastic body 32R. The coating film 33R has a thickness of approximately 20 μm. The lubricating film 34R is in liquid form and covers the surface of the coating film 33R.

[Stopper Material]

Next, the material of the stopper 3R according to the present embodiment will be described with reference to FIG. 5. The rubber elastic body 32R is made of a self-lubricating rubber. The rubber elastic body 32R includes a blended rubber (referred to simply as a "blend rubber" below) 321R of a natural rubber (NR) and a butadiene rubber (BR); and a bleeding lubricant 322R. Two types of oleic acid amides with different melting points are used as the bleeding lubricant 322R. The blend rubber 321R is included in an elastomer of the present invention.

The coating film 33R (made of "SOLVEST 398" from STT, Inc., for example) includes a silicone resin 330R having a mercapto group, a solid lubricant 331R made of PTFE, and a plurality of minute holes 332R. 120 parts by mass of the solid lubricant 331R is included per 100 parts by mass of the silicone resin 330R. The solid lubricant 331R has a generally spherical shape with a particle diameter (median diameter) of approximately 1 μm or less, wherein the average particle diameter is approximately 0.5 μm. The minute holes 332R are dispersed inside the coating film 33R. The size of the minute holes 332R is estimated to be at the level of molecules of a minute hole forming agent 334R used to form the minute holes 332R. Some of the minute holes 332R are filled with the bleeding lubricant 322R which has oozed out of the rubber elastic body 32R.

The lubricating film 34R is formed by the bleeding lubricant 322R of the rubber elastic body 32R and the minute hole forming agent 334R used to form the minute holes 332R of the coating film 33R. The method of forming the lubricating film 34R will be discussed later.

[Lower Arm Bushing and Bracket Structure]

Next, the structure of the lower arm bushing 4R and the bracket 5R according to the present embodiment will be briefly described with reference to FIG. 2. The lower arm bushing 4R includes an inner tube fitting 40R, an outer tube fitting 41R, and a rubber member 42R. The inner tube fitting 40R is made of steel and has a cylindrical shape. The bolt 841R is inserted into an inner portion of the inner tube fitting 40R. The outer tube fitting 41R is made of steel and has a cylindrical shape. The outer tube fitting 41R is disposed on a radially outer side of the inner tube fitting 40R. The outer tube fitting 41R is also press-fit to the bushing accommodation tube portion 840R. The rubber member 42R is made of rubber and interposed between the inner tube fitting 40R and the outer tube fitting 41R. The rubber member 42R, the inner tube fitting 40R, and the outer tube fitting 41R are bonded together by cross-linking.

The bracket 5R includes a front wall 50R and a rear wall 51R. A bolt insertion hole 500R is provided in the front wall 50R. A bolt insertion hole 510R is provided in the rear wall 51R. The bolt 841R passes through the bolt insertion hole 500R, the bolt insertion hole 300R, an inner portion of the inner tube fitting 40R, and the bolt insertion hole 510R. The nut 842R is threadedly fastened to a penetrating end (rear end) of the bolt 841R.

As shown in FIG. 2, a predetermined clearance C is secured between the stopper 3R and the bushing accommodation tube portion 840R. However, as a white arrow in FIG. 5 shows, the bushing accommodation tube portion 840R may slide forward with respect to the outer circumferential surface of the outer tube fitting 41R. In such cases, the rear surface of the stopper 3R (specifically, the surface of the lubricating film 34R covering the vicinity of a top portion of the rib 320R (and the surface of the coating film 33R at portions insufficiently covered by the lubricating film 34R)) is relatively in sliding contact with the front end surface of the bushing accommodation tube portion 840R.

[Stopper Production Method]

Figure 6:
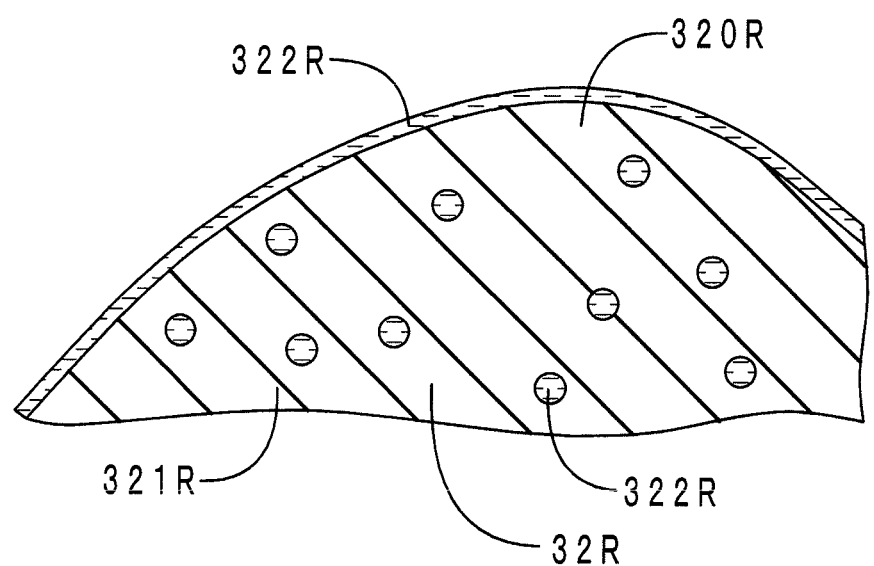
FIG. 6 is an enlarged cross-sectional view of a rubber elastic body after a cross-linking process, but before a degreasing process.
Figure 7:
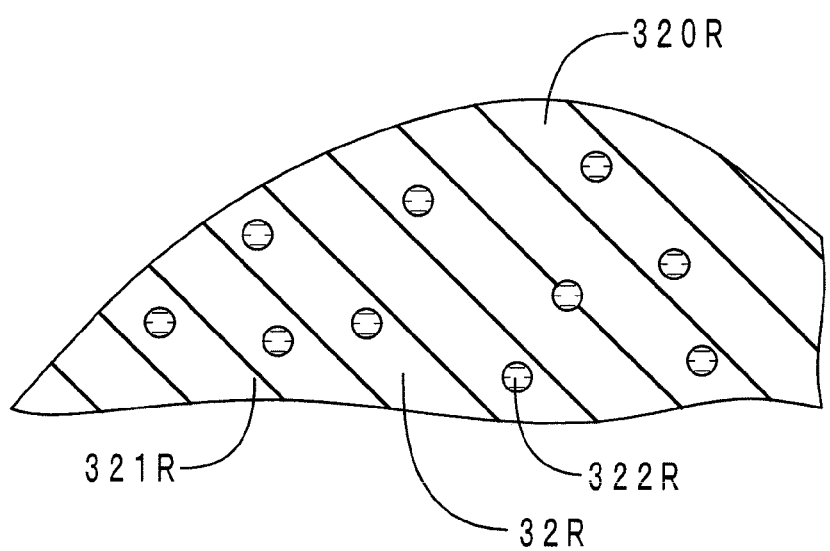
FIG. 7 is an enlarged cross-sectional view of the rubber elastic body after the degreasing process, but before a coating process.
Figure 8:
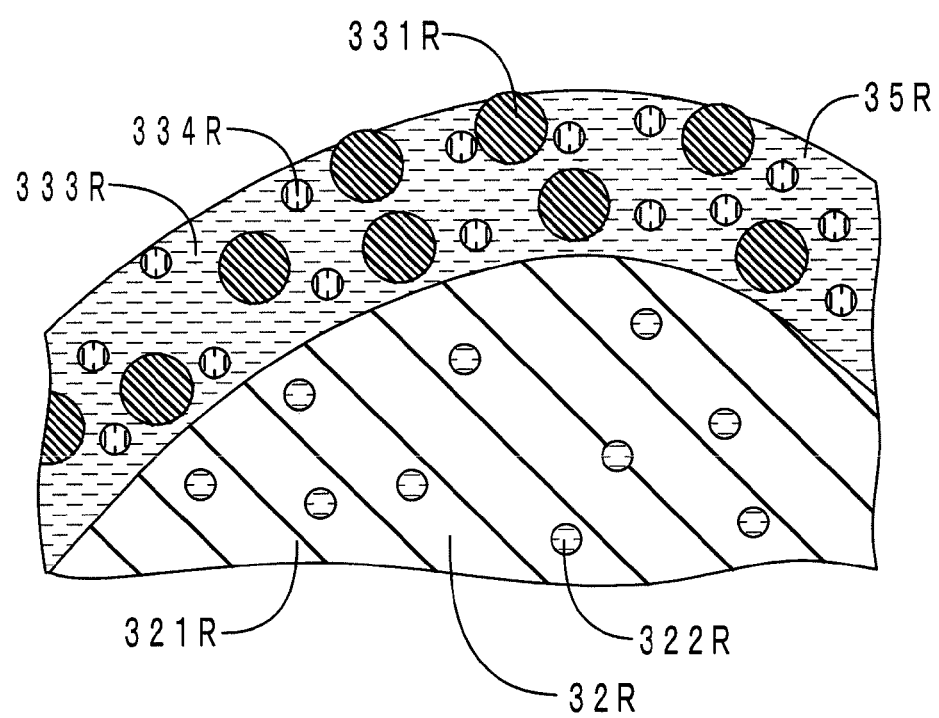
FIG. 8 is an enlarged cross-sectional view of the rubber elastic body after the coating process, but before a baking process.
Figure 9:
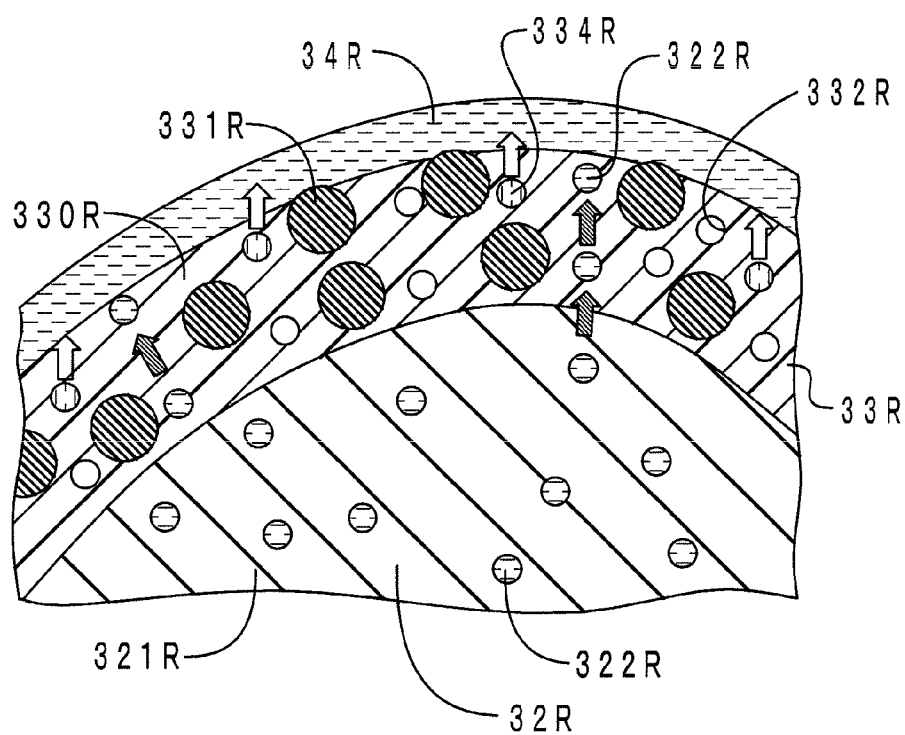
FIG. 9 is an enlarged cross-sectional view of the rubber elastic body during the baking process.

Next, a production method of the stopper 3R according to the present embodiment will be described. The production method of the stopper 3R according to the present embodiment includes a composition preparation process, a cross-linking process, a degreasing process, a coating process, and a baking process. FIG. 6 shows an enlarged cross-sectional view of the rubber elastic body after the cross-linking process, but before the degreasing process. FIG. 7 shows an enlarged cross-sectional view of the rubber elastic body after the degreasing process, but before the coating process. FIG. 8 shows an enlarged cross-sectional view of the rubber elastic body after the coating process, but before the baking process. FIG. 9 shows an enlarged cross-sectional view of the rubber elastic body during the baking process. Note that FIGS. 6 to 9 all show a region that corresponds to FIG. 5 (the region in FIG. 5 is rotated 90 degrees in FIGS. 6 to 9).

In the composition preparation process, a composition is prepared by mixing together a base material of the blend rubber 321R, the bleeding lubricant 322R, a cross-linking agent, and the like.

In the cross-linking process, first, the circular disc 30R (see FIG. 2) is disposed in a cavity. The composition is then injected into a mold cavity. Then, the base material of the blend rubber 321R inside the cavity undergoes a cross-linking reaction by maintaining the mold at 160° C. for 8 minutes. Thereafter, the mold is opened and an intermediate, in which the rubber elastic body 32R and the circular disc 30R are bonded by cross-linking, is retrieved from the cavity. As shown in FIG. 6, the bleeding lubricant 322R oozes onto the surface of the rubber elastic body 32R.

In the degreasing process, the surface of the rubber elastic body 32R is degreased using isopropyl alcohol (IPA). As shown in FIG. 7, the bleeding lubricant 322R is thus removed from the surface of the rubber elastic body 32R.

In the coating process, as shown in FIG. 8, the surface of the cleaned rubber elastic body 32R is coated with a coating 35R. The coating 35R contains a base material 333R of the silicone resin 330R having a mercapto group, the solid lubricant 331R made of PTFE, and the minute hole forming agent 334R. The minute hole forming agent 334R is one (main component with a lower melting point) of the two types of oleic acid amides used as the bleeding lubricant 322R. The amount of the minute hole forming agent 334R is 10% by mass if the solid content of the coating 35R is defined as 100% by mass.

In the baking process, the rubber elastic body 32R coated with the coating 35R is baked at 100° C. for 30 minutes. Baking thermally hardens the base material 333R shown in FIG. 8. Then, as shown in FIG. 9, the coating film 33R forms on the surface of the rubber elastic body 32R. In this event, as white arrows in FIG. 9 show, the minute hole forming agent 334R in the coating 35R is released to ooze onto the surface of the coating film 33R. In addition, as hatched arrows in FIG. 9 show, the bleeding lubricant 322R of the rubber elastic body 32R also penetrates the coating film 33R to ooze onto the surface of the coating film 33R. The lubricating film 34R is thus formed by the minute hole forming agent 334R and the bleeding lubricant 322R which have oozed onto the surface of the coating film 33R. In addition, the minute holes 332R are formed in the coating film 33R after the minute hole forming agent 334R is released. Thus, the stopper 3R according to the present embodiment is produced.

[Operation and Effects]

Figure 10:
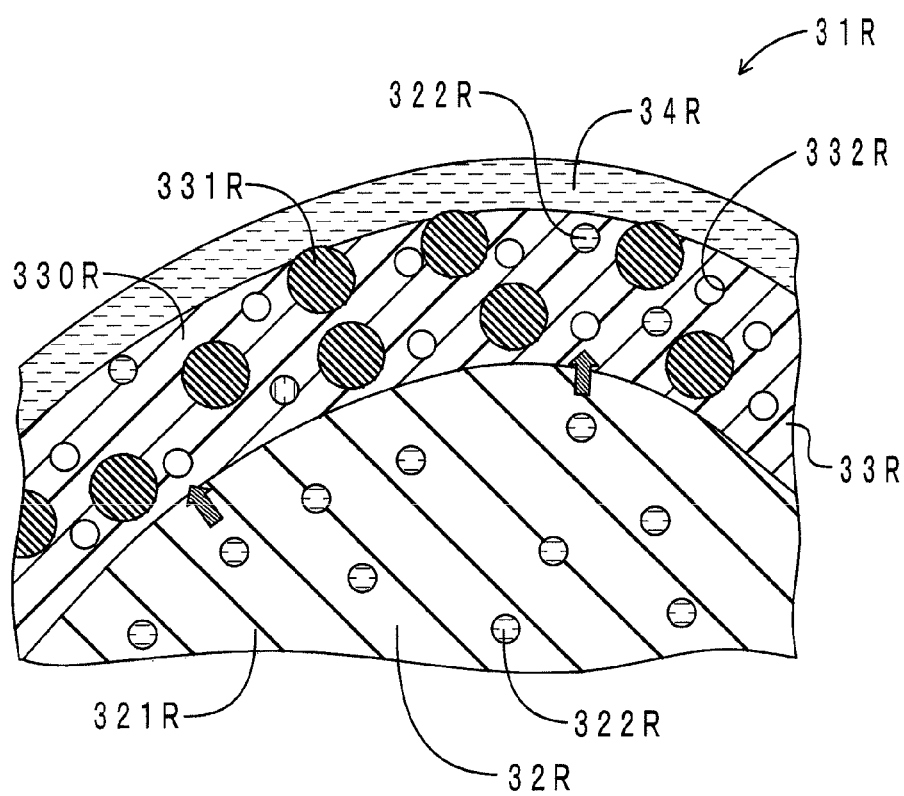
FIG. 10 is a partial enlarged cross-sectional view of a rubber member body of the stopper.

Next, the operation and effects of the stopper 3R and the production method thereof according to the present embodiment will be described. FIG. 10 is a partial enlarged cross-sectional view of the rubber member body 31R of the stopper 3R. Note that FIG. 10 shows a region that corresponds to FIG. 5 mentioned earlier (the region in FIG. 5 is rotated 90 degrees).

As shown in FIG. 10, the coating film 33R of the stopper 3R of the present embodiment is formed with the plurality of minute holes 332R. The minute holes 332R can reserve the bleeding lubricant 322R which has oozed out of the rubber elastic body 32R. Therefore, even if the bleeding lubricant 322R in the rubber elastic body 32R oozes out faster than the bleeding lubricant 322R penetrates the coating film 33R at a high temperature, the excessive amount of the bleeding lubricant 322R is reserved in the minute holes 332R in the coating film 33R as indicated by hatched arrows in FIG. 10. Hence, the bleeding lubricant 322R is not prone to accumulate at the interface between the coating film 33R and the rubber elastic body 32R. Consequently, in the stopper 3R according to the present embodiment, the coating film 33R is not prone to separation from the rubber elastic body 32R even at a high temperature. Thus, the stopper 3R according to the present embodiment provides good durability.

The lubricating film 34R of the stopper 3R according to the present embodiment is in sliding contact with the bushing accommodation tube portion 840R. In addition, for example, if the sliding surface has a portion without a sufficient lubricating film 34R due to a temporary lack of the lubricating film 34R or the like, the coating film 33R is exposed from the portion and in sliding contact with the bushing accommodation tube portion 840R. In other words, even if the lubricating film 34R is insufficient, the coating film 33R that contains the bleeding lubricant 322R and the solid lubricant 331R is in sliding contact with the bushing accommodation tube portion 840R. Thus, in the stopper 3R of the present embodiment, the lubricating film 34R normally is in sliding contact with the bushing accommodation tube portion 840R. If the lubricating film 34R is insufficient, however, the coating film 33R is in sliding contact with the bushing accommodation tube portion 840R. In addition, the rubber elastic body 32R is not in sliding contact with the bushing accommodation tube portion 840R. Thus, there is low friction resistance between the rubber elastic body 32R and the bushing accommodation tube portion 840R.

A mercapto group (—SH) is introduced to the silicone resin 330R of the matrix of the coating film 33R. The mercapto group is a functional group with high reactivity towards an elastomer. Therefore, according to the stopper 3R of the present embodiment, the rubber elastic body 32R and the coating film 33R can be strongly joined (chemically bonded). Therefore, the coating film 33R is not prone to separation from the rubber elastic body 32R. The coating film 33R also easily deforms to follow up deformation of the rubber elastic body 32R. In addition, the solid lubricant 331R is made of PTFE having a particularly small friction coefficient. Thus, in consideration of this point as well, the coating film 33R of the stopper 3R according to the present embodiment has low friction resistance with respect to the bushing accommodation tube portion 840R. Moreover, 120 parts by mass of the solid lubricant 331R is included per 100 parts by mass of the silicone resin 330R. Therefore, the durability of the coating film 33R can be maintained and the friction resistance of the coating film 33R with respect to the bushing accommodation tube portion 840R is reduced.

The matrix of the coating film 33R (made of "SOLVEST 398" from STT, Inc., for example) is the silicone resin 330R. The silicone resin 330R has a less dense cross-linked structure than a straight silicone resin and a modified product thereof, and the silicone resin 330R has rubber elasticity. This facilitates penetration of the bleeding lubricant 322R of the rubber elastic body 32R through the coating film 33R. Therefore, the lubricating film 34R can be reliably formed on the surface of the coating film 33R. In addition, the minute hole forming agent 334R (bleeding lubricant) is easily removed from the coating film 33R which is being cured. On the other hand, the matrix of the rubber elastic body 32R is the blend rubber 321R. Here, the minute hole forming agent 334R moves in the silicone resin 330R faster than the bleeding lubricant 322R moves in the blend rubber 321R. Therefore, the minute holes 332R can be reliably formed during baking.

According to the production method of the stopper 3R of the present embodiment, as shown in FIGS. 6 and 7, the bleeding lubricant 322R oozing from the surface of the rubber elastic body 32R is temporarily removed by degreasing the surface of the rubber elastic body 32R in the degreasing process. Therefore, as shown in FIG. 8, the coating 35R can be reliably coated on the surface of the rubber elastic body 32R in the coating process.

In addition, the coating 35R contains the minute hole forming agent 334R. In the baking process, as shown in FIG. 9, the minute hole forming agent 334R is released when the coating 35R is cured, whereby the plurality of minute holes 332R can be formed inside the coating 33R. Thus, according to the production method of the stopper 3R according to the present embodiment, the coating film 33R having the plurality of minute holes 332R can be relatively easily formed.

In addition, the minute hole forming agent 334R is one of the two types of oleic acid amides used as the bleeding lubricant 322R. That is, the minute hole forming agent 334R is the same as one of the components of the bleeding lubricant 322R in the rubber elastic body 32R. Therefore, the lubricating film 34R which affects the rubber elastic body 32R to a small degree and which is stable can be formed. Moreover, impurities are not prone to remain in the coating film 33R or the lubricating film 34R, and the performance of the coating film 33R or the lubricating film 34R is not prone to be affected. Furthermore, the amount of the minute hole forming agent 334R is 10% by mass if the solid content of the coating 35R is defined as 100% by mass. This makes it possible to form the minute holes 332R necessary to reserve the bleeding lubricant 322R while maintaining the performance of the coating film 33R.

Second Embodiment

The present embodiment practices the anti-vibration rubber member of the present invention as a stabilizer bushing.

[Stabilizer Bushing Layout]

Figure 11:
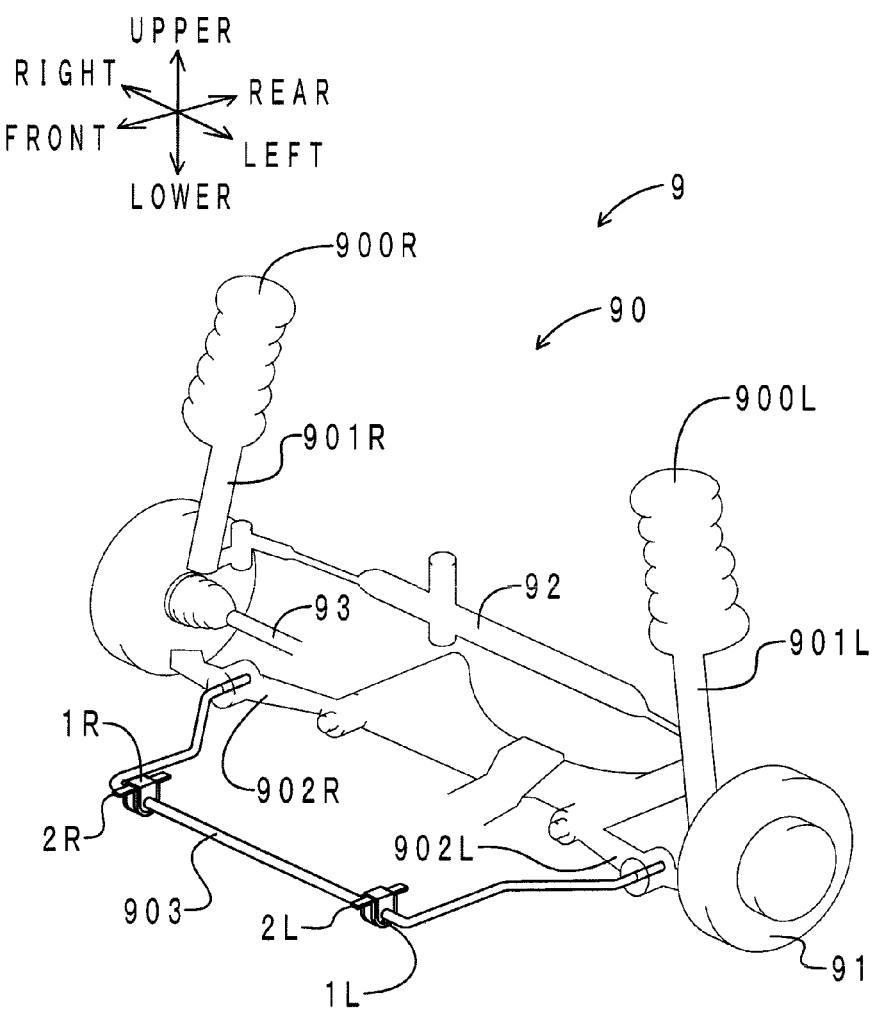
FIG. 11 is a layout drawing of a stabilizer bushing according to a second embodiment.

First, the layout of the stabilizer bushing according to the present embodiment will be described. FIG. 11 shows a layout drawing of the stabilizer bushing according to the present embodiment. As shown in FIG. 11, members including a suspension 90, a hub unit 91, a steering gear 92, and a drive shaft 93 are arranged in the vicinity of front wheels of a vehicle 9. The suspension 90 includes springs 900L, 900R, shock absorbers 901L, 901R, lower suspension arms 902L, 902R, a stabilizer bar 903, and the like. The stabilizer bar 903 is made of steel and has a long-axis pipe configuration that expands forward in a C shape. Both ends of the stabilizer bar 903 in the left-right direction are connected to the lower suspension arms 902L, 902R. Two left and right locations in a center portion of the stabilizer bar 903 are connected to a body (not shown) of the vehicle 9 through stabilizer bushings 1L, 1R and brackets 2L, 2R. Thus, the stabilizer bushings 1L, 1R are interposed between the stabilizer bar 903 and the body of the vehicle 9. The stabilizer bushings 1L, 1R suppress the transmission of vibration input from the front wheels to the body of the vehicle 9 through the stabilizer bar 903. The stabilizer bar 903 is included in the mating member of the present invention.

[Stabilizer Bushing Structure]

Next, the structure of the stabilizer bushings 1L, 1R according to the present embodiment will be described. The two left and right stabilizer bushings 1L, 1R have identical structures. The structure of the left stabilizer bushing 1L will be explained below, and this description also serves to explain the structure of the right stabilizer bushing 1R.

Figure 12:
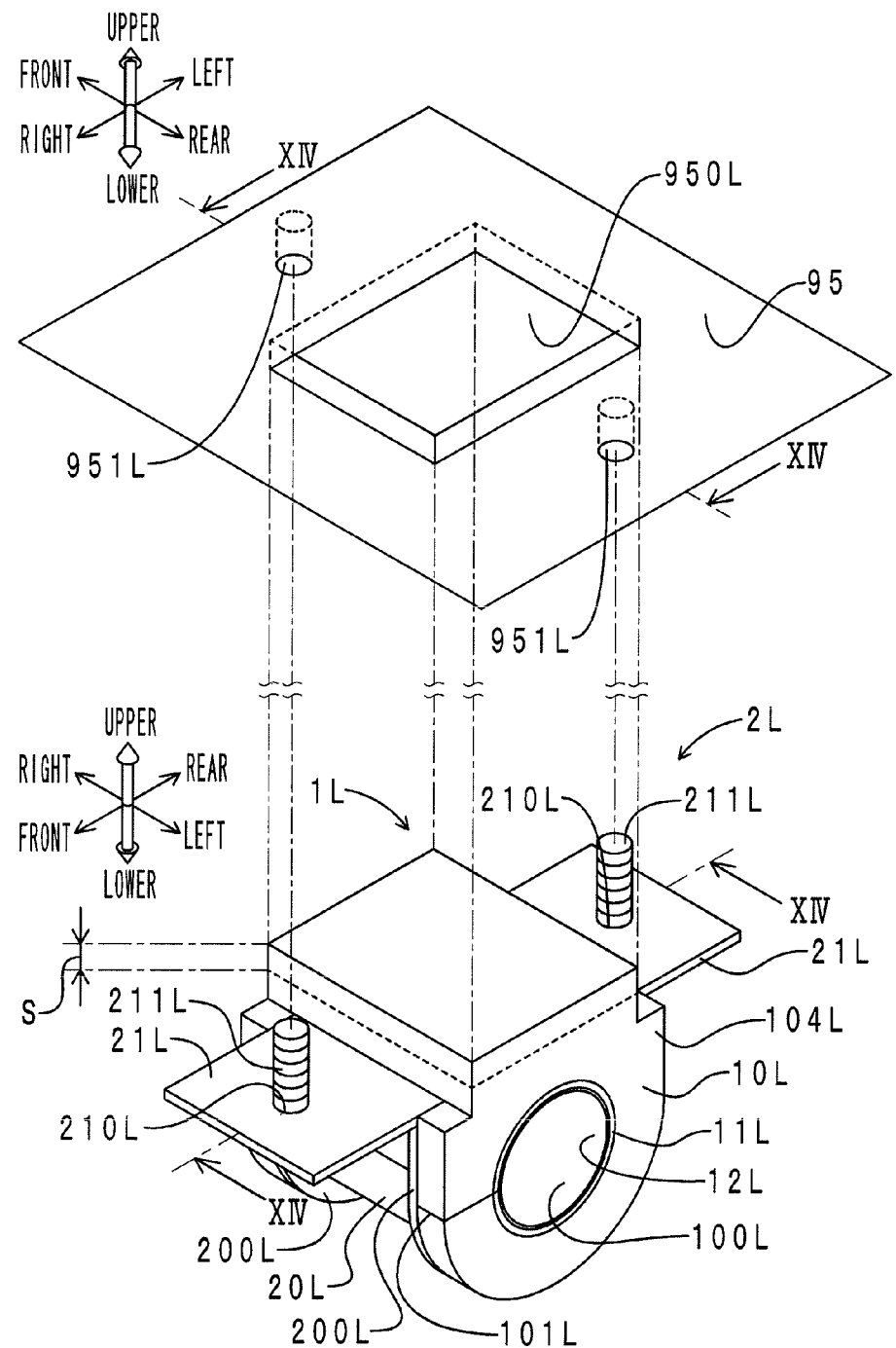
FIG. 12 is a composite perspective view of the stabilizer bushing and a bracket.
Figure 13:
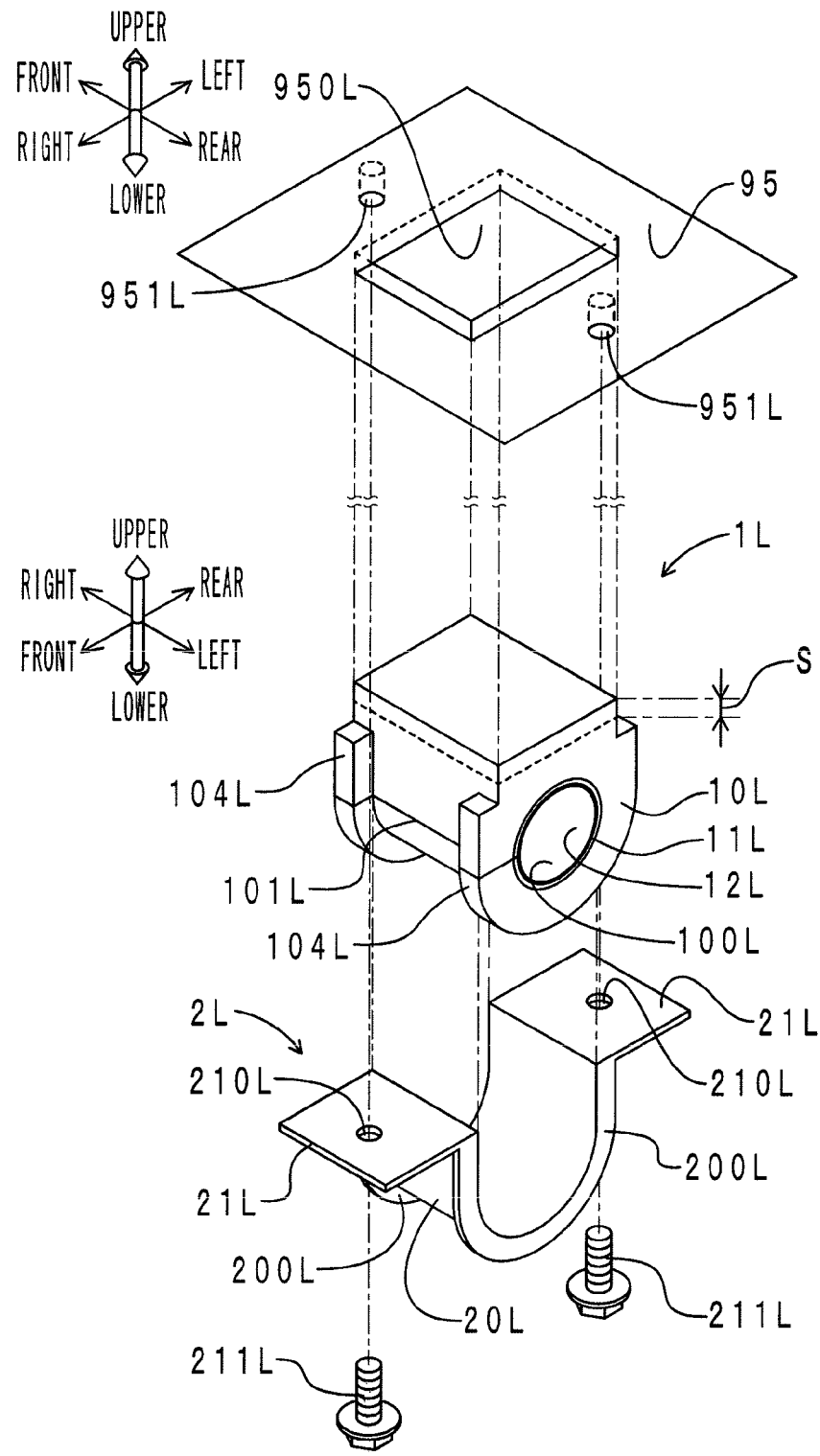
FIG. 13 is an exploded perspective view of the stabilizer bushing and the bracket.
Figure 14:
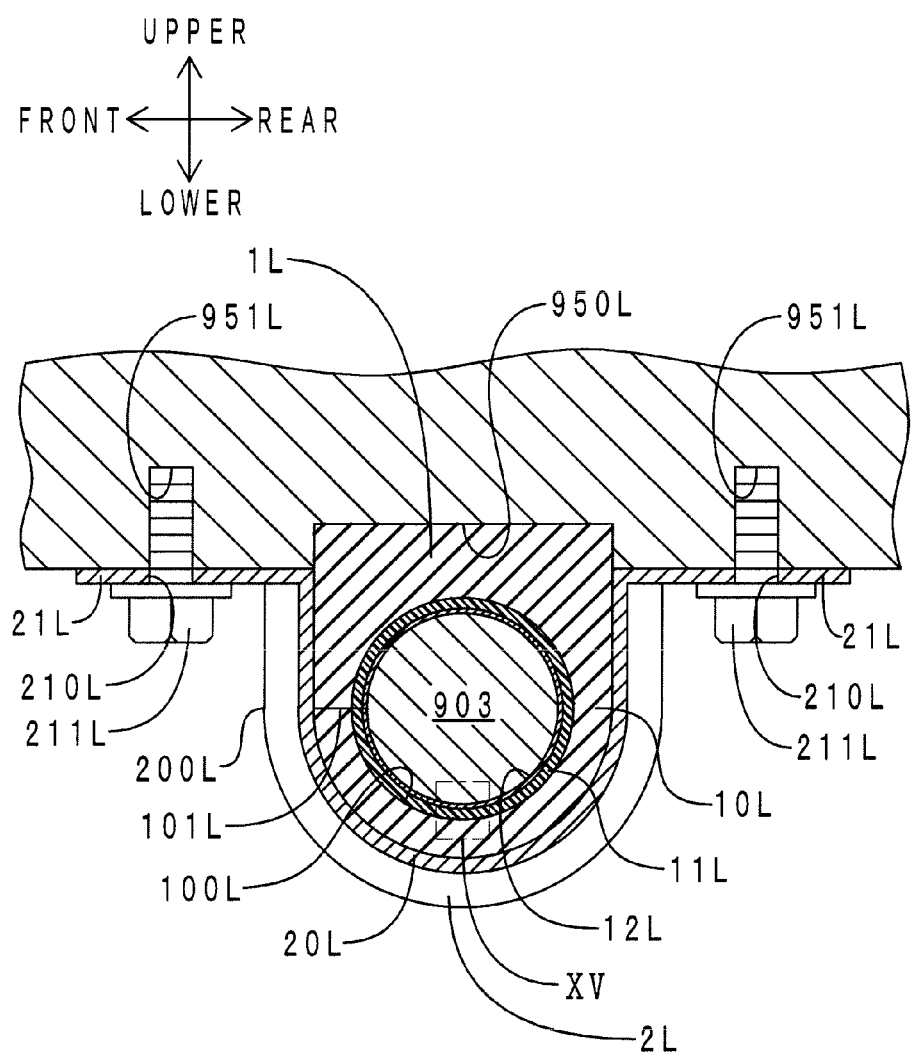
FIG. 14 is a cross-sectional view in the direction of a line XIV-XIV in FIG. 12.

FIG. 12 shows a composite perspective view of the stabilizer bushing and the bracket according to the present embodiment. FIG. 13 shows an exploded perspective view of the stabilizer bushing and the bracket according to the present embodiment. FIG. 14 shows a cross-sectional view in the direction of a line XIV-XIV in FIG. 12. As shown in FIGS. 12 to 14, the stabilizer bushing 1L of the present embodiment includes a rubber elastic body 10L, a coating film 11L, and a lubricating film 12L.

The rubber elastic body 10L has a solid U-shaped configuration when viewed from the left or right direction. In other words, an upper portion of the rubber elastic body 10L has a rectangular shape. A lower portion of the rubber elastic body 10L has a semicircular shape. The rubber elastic body 10L includes a holding hole 100L that passes through the rubber elastic body 10L in the left-right direction. The inner circumferential surface of the holding hole 100L is included in the sliding inner surface of the present invention. The inner circumferential surface of the holding hole 100L has a predetermined curvature and is shaped as a generally smooth surface. In other words, the inner circumferential surface of the holding hole 100L is not formed with artificial unevenness. An outer portion of the rubber elastic body 100L and an inner portion of the holding hole 100L communicate through a cut portion 101L. The stabilizer bar 903 is disposed in the holding hole 100L. The stabilizer bar 903 is inserted from an outer portion of the rubber elastic body 10L into an inner portion of the holding hole 100L through an opening that is formed by opening the cut portion 101L in the up-down direction. Both left and right edges of the rubber elastic body 10L are formed with a pair of flange portions 104L. The pair of flange portions 104L has a U-shaped configuration that opens upward.

The coating film 11L has a cylindrical shape. The coating film 11L covers the inner circumferential surface of the holding hole 100L. The coating film 11L has a thickness (radial thickness) of approximately 20 μm. The lubricating film 12L is in liquid form and covers the surface (inner circumferential surface) of the coating film 11L. The surface of the lubricating film 12L (the surface of the coating film 11L if the lubricating film 12L is insufficient) is in contact with the outer circumferential surface of the stabilizer bar 903.

[Stabilizer Bushing Material]

Figure 15:
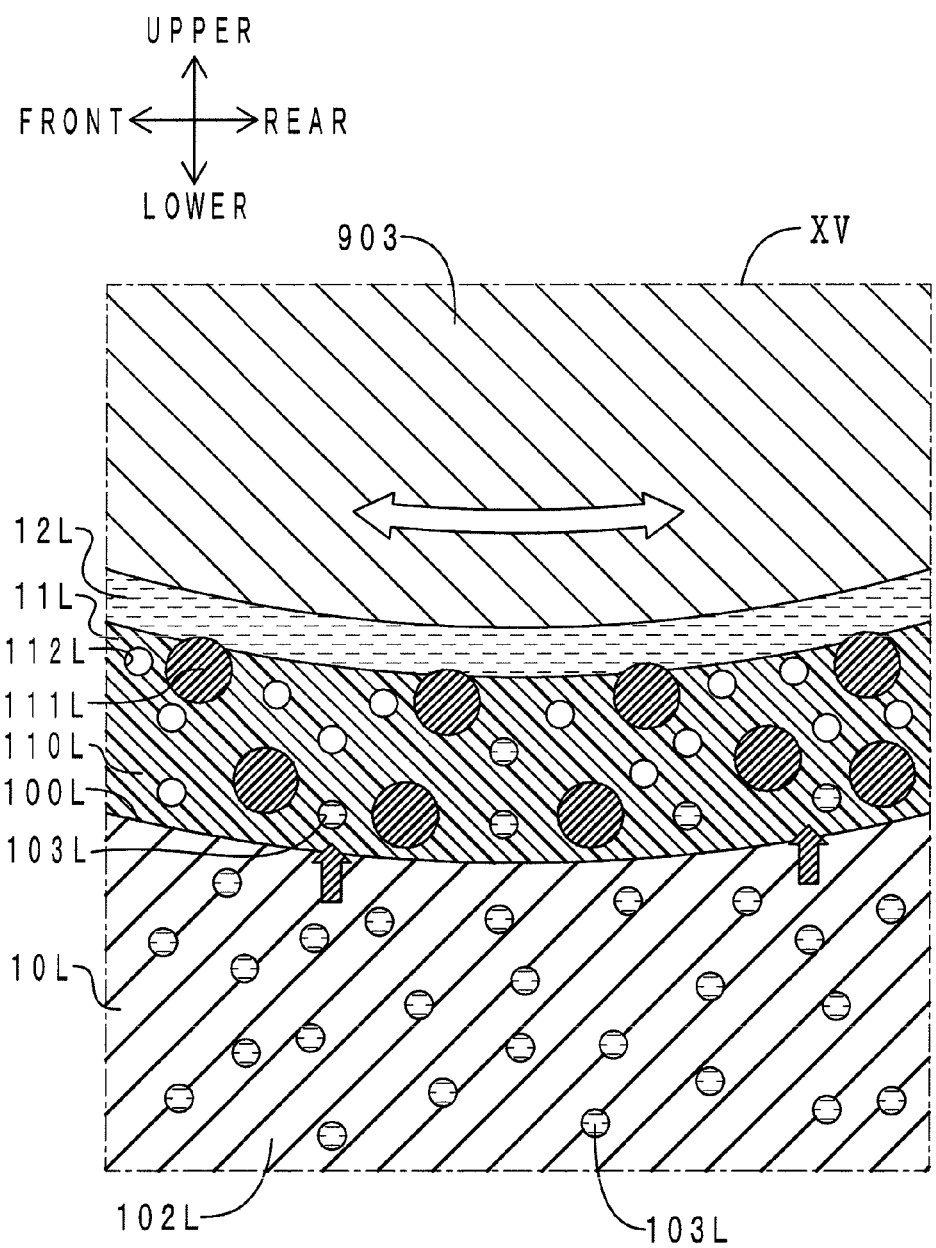
FIG. 15 is an enlarged view of inside a box XV in FIG. 14.

Next, the material of the stabilizer bushings 1L, 1R according to the present embodiment will be described. FIG. 15 shows an enlarged view of inside a box XV in FIG. 14. Note that FIG. 15 is a schematic diagram for explaining a function of the stabilizer bushings 1L, 1R according to the present embodiment.

The rubber elastic body 10L is made of a self-lubricating rubber. The rubber elastic body 10L includes a blended rubber (referred to simply as a "blend rubber" below) 102L of an NR and a BR, and a bleeding lubricant 103L. Two types of oleic acid amides with different melting points are used as the bleeding lubricant 103L. The blend rubber 102L is included in an elastomer of the present invention.

The coating film 11L (made of "SOLVEST 398" from STT, Inc., for example) includes a silicone resin 110L having a mercapto group, a solid lubricant 111L made of PTFE, and a plurality of minute holes 112L. 120 parts by mass of the solid lubricant 111L is included per 100 parts by mass of the silicone resin 110L. The solid lubricant 111L has a generally spherical shape with a particle diameter (median diameter) of approximately 1 µm or less, wherein the average particle diameter is approximately 0.5 µm. The minute holes 112L are dispersed inside the coating film 11L. The size of the minute holes 112L is estimated to be at the level of molecules of a minute hole forming agent used to form the minute holes 112L. Some of the minute holes 112L are filled with the bleeding lubricant 103L which has oozed out of the rubber elastic body 10L.

The lubricating film 12L is formed by the bleeding lubricant 103L of the rubber elastic body 10L and the minute hole forming agent used to form the minute holes 112L of the coating film 11L. That is, when the coating film 11L is formed by baking, the minute hole forming agent (one (main component with a lower melting point) of the two types of oleic acid amides used as the bleeding lubricant 103L) in the coating of the coating film 11L is released to ooze onto the surface of the coating film 11L. The bleeding lubricant 103L of the rubber elastic body 10L also penetrates the coating film 11L and oozes onto the surface of the coating film 11L. The lubricating film 12L is thus formed by the minute hole forming agent and the bleeding lubricant 103L which have oozed onto the surface of the coating film 11L.

As shown by the white double-ended arrows in FIG. 15, the stabilizer bar 903 twists around an axis in accordance with the behavior of the vehicle 9. Meanwhile, the stabilizer bushing 1L is fixed to the body of the vehicle 9 through the bracket 2L that will be described later. Therefore, the surface of the lubricating film 12L (the surface of the coating film 11L if the lubricating film 12L is insufficient) is relatively in sliding contact with the outer circumferential surface of the stabilizer bar 903.

[Bracket Structure]

Next, the structure of the brackets 2L, 2R according to the present embodiment will be described. The two left and right brackets 2L, 2R have identical structures. The structure of the left bracket 2L will be explained below, and this description also serves to explain the structure of the right bracket 2R. As shown in FIGS. 12 to 14, the bracket 2L of the present embodiment is made of steel and includes a bushing support portion 20L, and a pair of fixing portions 21L.

The bushing support portion 20L has a U-shaped configuration that opens upward when viewed from the left or right direction. Both left and right edges of the bushing support portion 20L are formed with a pair of flange portions 200L. A portion between the pair of flange portions 104L of the stabilizer bushing 1L is accommodated in an inner portion of the U-shaped opening of the bushing support portion 20L. The inner sides in the left-right direction of the pair of flange portions 104L contact the pair of flange portions 200L. Through such contact, separation of the stabilizer bushing 1L from the bracket 2L in the left-right direction can be suppressed.

The pair of fixing portions 21L has a rectangular plate configuration. The pair of fixing portions 21L continues from both ends of the U-shaped bushing support portion 20L. A bolt insertion hole 210L is provided in each of the fixing portions 21L. A bolt 211L is inserted into each of bolt insertion holes 210L from below. Meanwhile, a recess portion 950L and a pair of bolt securing holes 951L are disposed on the lower surface of a body 95 of the vehicle 9. The space in an inner portion of the recess portion 950L has a rectangular parallelepiped shape. The upper portion of the stabilizer bushing 1L is inserted into the recess portion 950L. The pair of bolt securing holes 951L is arranged in the front-rear direction of the recess portion 950L. The bolt 211L passes through the bolt insertion hole 210L and is threadedly fastened in the bolt securing hole 951L. Thus, the bracket 2L is fixed to the lower surface of the body 95 by the pair of bolts 211L. In addition, the stabilizer bushing 1L is held and fixed between the bracket 2L and the lower surface of the body 95. During such fixing, the upper portion of the rubber elastic body 10L is compressed and deformed by a fastening amount S (see FIGS. 12 and 13). Through the fastening amount S, the stabilizer bushing 1L is in press-contact with the outer circumferential surface of the stabilizer bar 903.

[Stabilizer Bushing Production Method]

The production method of the stabilizer bushings 1L, 1R according to the present embodiment includes a composition preparation process, a cross-linking process, a degreasing process, a coating process, and a baking process. The production method of the stabilizer bushings 1L, 1R according to the present embodiment is the same as the production method of the stopper according to the first embodiment except that it is not necessary to insert the circular disc 30R (see FIG. 2) into a cavity in the cross-linking process. Thus, a description of the production method will not be included here.

[Operation and Effects]

Next, the operation and effects of the stabilizer bushings 1L, 1R and the production method thereof according to the present embodiment will be described. With respect to portions with common structures, the stabilizer bushings 1L, 1R and the production method thereof according to the present embodiment have the same operation and effects as the stopper and the production method thereof according to the first embodiment.

That is, according to the production method of the stabilizer bushings 1L, 1R of the present embodiment, the coating film 11L having the plurality of minute holes 112L can be relatively easily formed. In addition, the minute holes 112L can reserve the bleeding lubricant 103L which has oozed out of the rubber elastic body 10L. Therefore, even if the bleeding lubricant 103L in the rubber elastic body 10L oozes out faster than the bleeding lubricant 103L penetrates the coating film 11L at a high temperature, the excessive amount of the bleeding lubricant 103L is reserved in the minute holes 112L in the coating film 11L as indicated by hatched arrows in FIG. 15. Hence, the bleeding lubricant 103L is not prone to accumulate at the interface between the coating film 11L and the rubber elastic body 10L. Consequently, in the stabilizer bushings 1L, 1R according to the present embodiment, the coating film 11L is not prone to separation from the rubber elastic body 10L even at a high temperature. Thus, the stabilizer bushings 1L, 1R according to the present embodiment provide good durability.

Third Embodiment

Stabilizer bushings according to the present embodiment are different from the stabilizer bushings according to the second embodiment in that a foaming agent, rather than the bleeding lubricant, is used as the minute hole forming agent for the coating film in manufacturing the stabilizer bushings. Thus, only such differences will be described.

As in the second embodiment, the production method of the stabilizer bushings according to the present embodiment includes a composition preparation process, a cross-linking process, a degreasing process, a coating process, and a baking process. In the coating process, the surface of the rubber elastic body 10L is coated with a coating containing a base material of the silicone resin 110L having a mercapto group, the solid lubricant 111L made of PTFE, and a minute hole forming agent 113L. A foaming agent is used as the minute hole forming agent 113L. The foaming agent contains a main agent ("NEOCELLBORN (registered trademark) N#100M" manufactured by Eiwa Chemical Industry Co, Ltd.) and an auxiliary agent ("CELLPASTE 101" manufactured by Eiwa Chemical Industry Co, Ltd.). The amount of the minute hole forming agent 113L is 10% by mass (5% by mass of the main agent and 5% by mass of the auxiliary agent) if the solid content of the coating is defined as 100% by mass.

Figure 16:
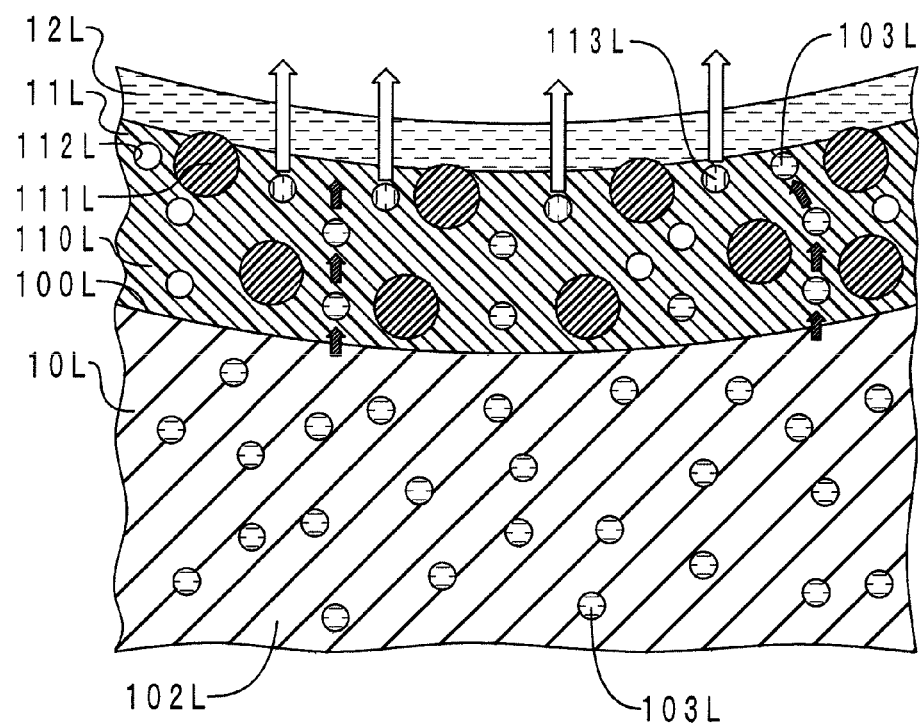
FIG. 16 is an enlarged cross-sectional view of a rubber elastic body in a baking process of a production method of a stabilizer bushing according to a third embodiment.

FIG. 16 shows an enlarged cross-sectional view of the rubber elastic body during the baking process. Note that FIG. 16 shows a portion corresponding to FIG. 5 mentioned earlier. In the baking process, the rubber elastic body 10L coated with the coating is baked at 100° C. for 30 minutes. Baking thermally hardens the base material of the silicone resin 110L having a mercapto group. Then, the coating film 11L forms on the surface of the rubber elastic body 10L. In this event, as shown by the white long arrows in FIG. 16, the minute hole forming agent 113L in the coating is gasified to be released from the coating film 11L. On the other hand, as hatched short arrows in FIG. 16 show, the bleeding lubricant 103L of the rubber elastic body 10L penetrates the coating film 11L to ooze onto the surface of the coating film 11L. Hence, the lubricating film 12L is formed by only the bleeding lubricant 103L which has oozed onto the surface of the coating film 111. In addition, the minute holes 112L are formed in the coating film 11L after the minute hole forming agent 113L is released. Thus, the stabilizer bushings according to the present embodiment are produced.

In the production method of the stabilizer bushings according to the present embodiment, a foaming agent is used as the minute hole forming agent 113L. The foaming agent is gasified when baked, and released from the coating film 11L which is being cured. Thus, the minute holes 112L can be formed without hindering formation of the coating film 11L or the lubricating film 12L. Moreover, impurities are not prone to remain in the coating film 11L or the lubricating film 12L, and the performance of the coating film 11L or the lubricating film 12L is not prone to be affected. Furthermore, the amount of the minute hole forming agent 113L is 10% by mass if the solid content of the coating is defined as 100% by mass. This makes it possible to form the minute holes 112L necessary to reserve the bleeding lubricant 103L while maintaining the performance of the coating film 11L. The foaming agent is powdery. In this case, the size of the minute holes 112L can be adjusted in accordance with the particle diameter of the powder used and the foaming conditions (such as temperature).

Other Embodiments

Embodiments of the anti-vibration rubber member and the production method thereof according to the present invention were described above. However, the embodiments of the present invention are not particularly limited to the modes described above. Various modifications and improvements may also be implemented by a person having ordinary skill in the art.

The elastomer of the rubber elastic bodies are not particularly limited in terms of material. For example, NR, BR, isoprene rubber (IR), styrene-butadiene rubber (SBR), chloroprene rubber (CR), nitrile rubber (NBR), ethylene-propylene rubber (EPDM), butyl rubber (IIR), acrylic rubber (ACM), urethane rubber (U), silicone rubber, any blend material of these rubbers, and the like may be used.

The bleeding lubricant of the rubber elastic bodies is not particularly limited in terms of material. For example, a fatty acid amid (an unsaturated fatty acid amide (oleic acid amide, erucic acid amide, or the like), a saturated fatty acid amide (stearic acid amide, behenic acid amide, or the like)), a silicone oil, a polyethylene glycol surfactant, and the like may be used.

The resin of the coating films is not particularly limited in terms of material. For example, a polyester resin, an acrylic resin, a urethane resin, and the like may be used besides the silicone resin.

The functional group of the resin of the coating films is not particularly limited to the mercapto group. For example, a vinyl group, an epoxy group, a methacryloxy group, an amino group, and the like may be used. The functional group is preferably selected in accordance with the elastomer material of the rubber elastic bodies.

The solid lubricant of the coating films is not particularly limited in terms of material. For example, graphite, molybdenum disulfide, fluorine resin, and the like may be used. Examples of the fluorine resin include a tetrafluoroethylene-perfluoroalkoxy vinyl ether copolymer (PFA), a tetrafluoroethylene-hexafluoropropylene copolymer (FEP), polychlorotrifluoroethylene (PCTFE), a tetrafluoroethylene-ethylene copolymer (ETFE), a chlorotrifluoroethylene-ethylene copolymer (ECTFE), polyvinylidene fluoride (PVDF), polyvinyl fluoride (PVF). Note that the coating film does not necessarily contain a solid lubricant.

The minute hole forming agent is not particularly limited in terms of material. The minute hole forming agent may be such a material that is released from the coating when baked and that is not prone to hinder formation of the coating film or the lubricating film. In the case where the minute hole forming agent contains the same component as the bleeding lubricant of the rubber elastic body as in the first and second embodiments described above, the lubricating film which affects the rubber elastic body to a small degree and which is stable can be formed. Moreover, impurities are not prone to remain, and therefore the performance of the coating film or the lubricating film is not prone to be affected. Furthermore, the moving speed of the bleeding lubricant differs in accordance with the material of the matrix (the resin of the coating film, the elastomer of the rubber elastic body). Therefore, the release speed of the minute hole forming agent can be controlled in accordance with the choice of the resin, for example.

The baking temperature and the baking time in the baking process are not particularly limited. The baking temperature and the baking time may be determined as appropriate in consideration of the type of the resin, the release speed of the minute hole forming agent, the oozing speed of the bleeding lubricant, and so forth.

The size, the proportion in volume, and so forth of the minute holes formed in the coating film are also not particularly limited. Such values may be determined as appropriate in consideration of the balance between the function of reserving the bleeding lubricant which has oozed out of the rubber elastic body and the strength and the rigidity of the coating film.

In the above embodiments, the anti-vibration rubber member of the present invention is practiced as the stopper 3R for the lower suspension arm 84R and the stabilizer bushings 1L, 1R. However, the anti-vibration rubber member of the present invention may also be practiced as a stopper for an engine mount such as disclosed in Japanese Patent Application Publication No. 2005-106169 (JP 2005-106169 A) and Japanese Patent Application Publication No. 2005-249062 (JP 2005-249062 A), and a stopper for a differential mount such as disclosed in Japanese Patent Application Publication No. 2008-89002 (JP 2008-89002 A) and Japanese Patent Application Publication No. 2008-95785 (JP 2008-95785 A).

EXAMPLES

Hereinafter, a torque measurement test performed on the anti-vibration rubber member of the present invention will be described.

<Relationship Between Presence/Absence of Minute Holes and Torque>

[Samples]

The stabilizer bushing 1L according to the second embodiment (see FIGS. 12 to 15) was used as a sample of Example 1. A stabilizer bushing configured in the same manner as that of Example 1 except that the coating film was formed from a coating containing no minute hole forming agent was used as a sample of Comparative Example 1. In the sample of Comparative Example 1, no minute holes were formed in the coating film.

[Test Method]

First, each sample was fixed to a jig (equivalent to the lower surface of the body 95 of the vehicle 9 according to the second embodiment) by the bracket 2L. Next, a shaft (equivalent to the stabilizer bar 903 of the second embodiment) was inserted into the holding hole 100L of each sample. Using a torque wrench, the shaft was subsequently twisted by ±15 degrees around an axis. The torque applied to the shaft was then measured. If the friction resistance between the shaft and the sample is low, the torque applied to the shaft will be small. Conversely, if the friction resistance between the shaft and the sample is high, the torque applied to the shaft will be large. With a twist of ±15 degrees counted as one twist, the shaft was subjected to one hundred thousand twists, and the torque was measured at predetermined numbers of twists.

[Test Results]

Figure 17:
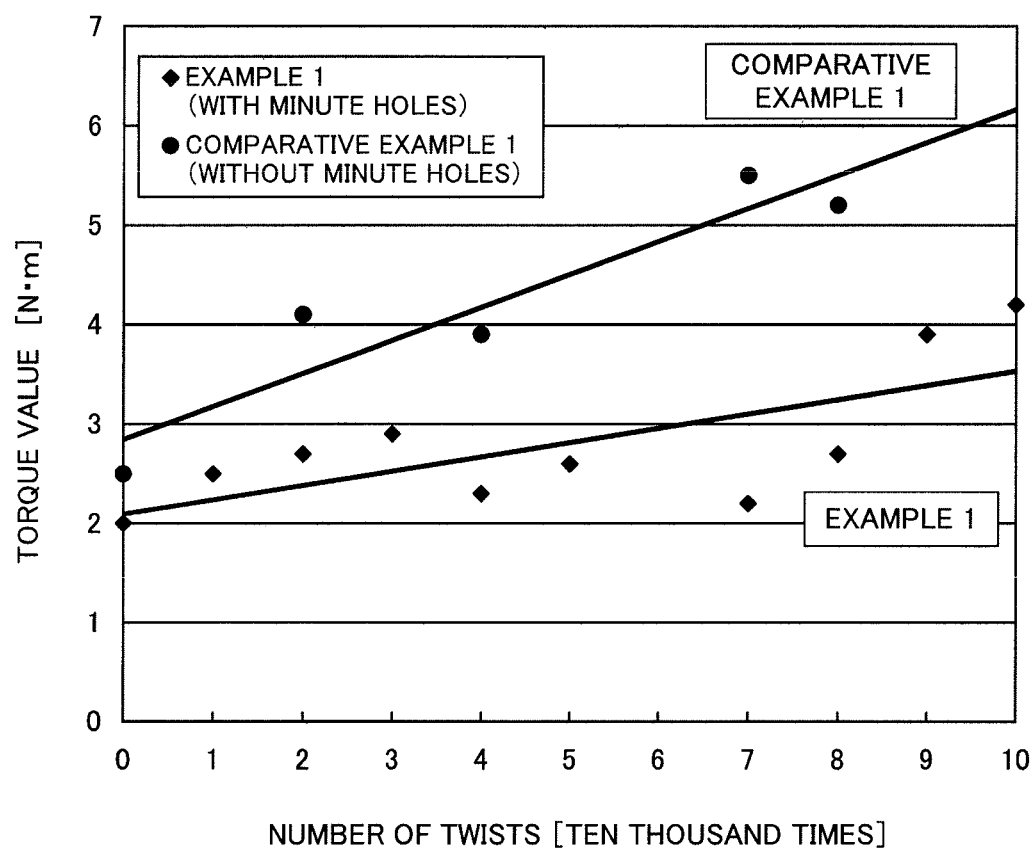
FIG. 17 is a graph showing the results of measuring torque for each sample of Example 1 and Comparative Example 1.

FIG. 17 shows the results of measuring the torque. As shown in FIG. 17, the torque increased at a lower rate for the sample of Example 1 than for the sample of Comparative Example 1. In the sample of Example 1, minute holes were formed in the coating film. Therefore, even if the temperature was raised by repeated twists and a large amount of the bleeding lubricant oozed out of the rubber elastic body, the excessive amount of the bleeding lubricant that could not penetrate the coating film was reserved in the minute holes in the coating film. That is, the bleeding lubricant which has oozed out was not prone to accumulate at the interface between the coating film and the rubber elastic body. Hence, in the sample of Example 1, it is considered that separation of the coating film was suppressed and that an increase in friction resistance between the sample and the shaft was suppressed.

<Relationship Between Amount of Minute Hole Forming Agent and Initial Torque>

[Samples]

A first group of samples used in the test was obtained by setting the amount of the minute hole forming agent (bleeding lubricant) in the stabilizer bushing 1L according to the second embodiment to seven levels. They were given sample Nos. W1 to W7. The seven levels are set as collectively shown in Table 1 below. The sample W4 corresponds to the sample of Example 1 mentioned earlier. Meanwhile, a second group of samples used in the test was obtained by setting the amount of the minute hole forming agent (foaming agent) in the stabilizer bushing according to the third embodiment to seven levels. They were given sample Nos. B1 to B7. The seven levels are set as collectively shown in Table 2 below.

TABLE 1

| Samples No. | W1 | W2 | W3 | W4 | W5 | W6 | W7 |
|---|---|---|---|---|---|---|---|
| Bleeding lubricant [% by mass] | 1 | 3 | 5 | 10 | 20 | 30 | 40 |

TABLE 2

| Samples No. | | B1 | B2 | B3 | B4 | B5 | B6 | B7 |
|---|---|---|---|---|---|---|---|---|
| Foaming agent | Main agent [% by mass] | 0.5 | 1.5 | 2.5 | 5 | 10 | 15 | 20 |
| | Auxiliary agent [% by mass] | 0.5 | 1.5 | 2.5 | 5 | 10 | 15 | 20 |

[Test Method]

In order to measure the torque, first, a shaft (equivalent to the stabilizer bar 903 of the second embodiment) was inserted into the holding hole 100L of each of the first and second samples. Next, each of the samples into which the shaft was inserted was mounted to a fixing jig. Using a torque wrench, the shaft was subsequently twisted by 90 degrees around an axis. The initial torque applied to the shaft was then measured.

[Test Results]

Figure 18:
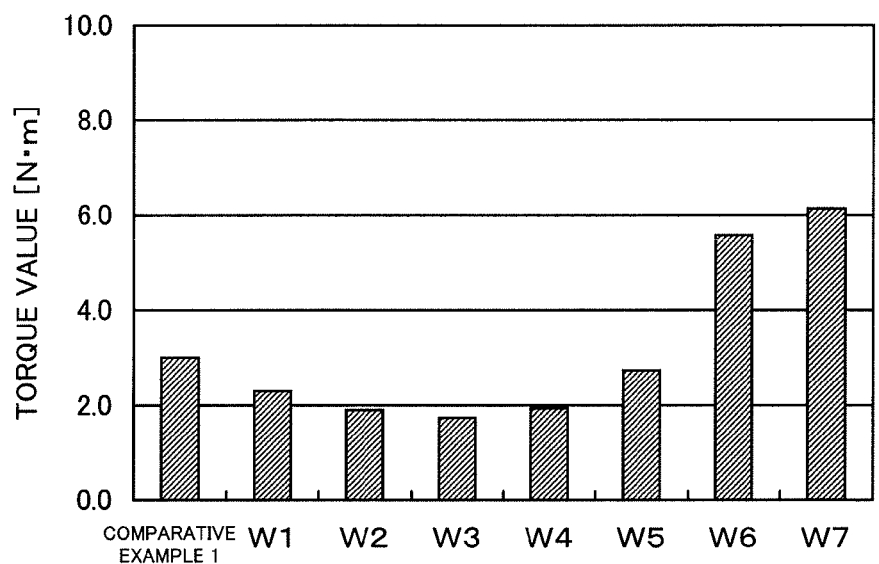
FIG. 18 is a graph showing the results of measuring torque for samples W1 to W7.
Figure 19:
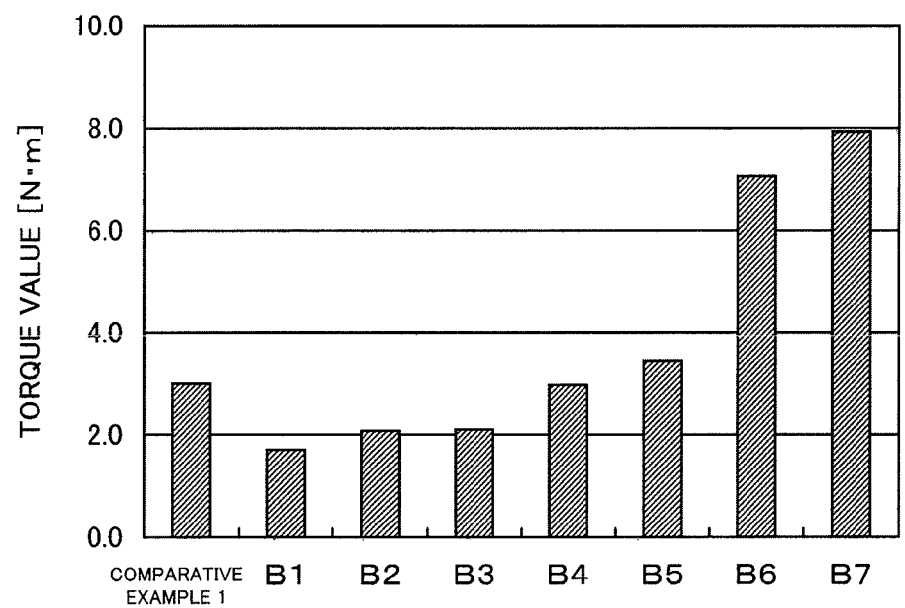
FIG. 19 is a graph showing the results of measuring torque for samples B1 to B7.

FIG. 18 shows the results of measuring torque for the samples W1 to W7. FIG. 19 shows the results of measuring torque for the samples B1 to B7. For comparison, FIGS. 18 and 19 also show the results of measuring torque in the same manner for the sample of Comparative Example 1 mentioned earlier.

As shown in FIG. 18, among the samples W1 to W7 in which the bleeding lubricant was compounded as the minute hole forming agent, the samples W1 to W5 containing 1 to 20% by mass of the bleeding lubricant produced torque lower than that produced by Comparative Example 1. On the other hand, the samples W6, W7 containing 30, 40% by mass, respectively, of the bleeding lubricant produced torque higher than that produced by Comparative Example 1.

As shown in FIG. 19, among the samples B1 to B7 in which the foaming agent was compounded as the minute hole forming agent, the samples B1 to B3 containing 1 to 5% by mass of the foaming agent (main agent+auxiliary agent) produced torque lower than that produced by Comparative Example 1. In addition, the samples B4, B5 containing 10, 20% by mass, respectively, of the foaming agent produced torque comparable to or slightly higher than that produced by Comparative Example 1. Further, the samples B6, B7 containing 30, 40% by mass, respectively, of the foaming agent produced torque higher than that produced by Comparative Example 1.

From these results, it was found desirable that the minute hole forming agent was compounded in an amount of 20% by mass or less in consideration of initial torque.

The invention claimed is:

1. An anti-vibration rubber member that absorbs at least a portion of vibration of a mating member and has a sliding surface that is relatively in sliding contact with the mating member, the anti-vibration rubber member characterized by comprising:
   a rubber elastic body that is made of a self-lubricating rubber containing an elastomer and a bleeding lubricant;
   a coating film that covers at least a portion of a sliding inner surface that is among a surface of the rubber elastic body and disposed on an inner side of the sliding surface, contains a resin having at least one type of functional group selected from a mercapto group, a vinyl group, an epoxy group, a methacryloxy group, and an amino group, is deformable to follow up deformation of the rubber elastic body, and is formed with a plurality of minute holes capable of reserving the bleeding lubricant which has oozed out of the rubber elastic body; and
   a lubricating film that covers at least a portion of a surface of the coating film, is formed to include the bleeding lubricant penetrating the coating film from the rubber elastic body and oozing onto the surface of the coating film, and forms at least a portion of the sliding surface.

2. The anti-vibration rubber member according to claim 1, wherein
   the bleeding lubricant which has oozed out of the rubber elastic body is reserved in at least some of the plurality of minute holes.

3. The anti-vibration rubber member according to claim 1, wherein
   the coating film further contains a solid lubricant.

4. The anti-vibration rubber member according to claim 3, wherein
   the solid lubricant is made of polytetrafluoroethylene.

5. The anti-vibration rubber member according to claim 4, wherein
   the coating film contains 200 parts by mass or less of the solid lubricant per 100 parts by mass of the resin.

6. The anti-vibration rubber member according to claim 1, wherein
   the resin is a silicone resin.

7. The anti-vibration rubber member according to claim 6, wherein
   the silicone resin has a less dense cross-linked structure than a straight silicone resin and a modified product thereof, and has rubber elasticity.

8. The anti-vibration rubber member according to claim 1, wherein
   the rubber elastic body has a holding hole in which the mating member is disposed, and the sliding inner surface is an inner circumferential surface of the holding hole.

9. A production method of an anti-vibration rubber member that absorbs at least a portion of vibration of a mating member and has a sliding surface that is relatively in sliding contact with the mating member, the production method of an anti-vibration rubber member characterized by comprising the steps of:
   creating a rubber elastic body that is made of a self-lubricating rubber containing an elastomer and a bleeding lubricant through a cross-linking reaction;
   degreasing a sliding inner surface that is among a surface of the rubber elastic body and disposed on an inner side of the sliding surface;
   coating on the sliding inner surface after degreasing a coating that contains a thermosetting resin having at least one type of functional group selected from a mercapto group, a vinyl group, an epoxy group, a methacryloxy group, and an amino group, and a minute hole forming agent that is released when baked to form minute holes in a coating film; and
   baking the rubber elastic body coated with the coating such that a coating film is formed on the sliding inner surface while the minute hole forming agent is released from the coating, and the bleeding lubricant of the rubber elastic body penetrates the coating film and oozes onto a surface of the coating film to form a lubricating film including the bleeding lubricant on the surface of the coating film.

10. The production method of an anti-vibration rubber member according to claim 9, wherein
    the minute hole forming agent is formed from at least one type selected from a bleeding lubricant and a foaming agent.

11. The production method of an anti-vibration rubber member according to claim 10, wherein
    the minute hole forming agent includes at least one type of the bleeding lubricant contained in the rubber elastic body.

12. The production method of an anti-vibration rubber member according to claim 9, wherein:
    the minute hole forming agent is formed from a bleeding lubricant; and
    the lubricating film is formed from both the bleeding lubricant contained in the rubber elastic body and the minute hole forming agent.

13. The production method of an anti-vibration rubber member according to claim 9, wherein
    the amount of the minute hole forming agent is 0.5% by mass or more and 20% by mass or less if the solid content forming the coating is defined as 100% by mass.

* * * * *